United States Patent
Manolakos et al.

(10) Patent No.: US 11,616,599 B2
(45) Date of Patent: Mar. 28, 2023

(54) TWO-STAGE INTERLEAVING TECHNIQUES FOR WIRELESS COMMUNICATIONS

(71) Applicant: QUALCOMM Incorporated, San Diego, CA (US)

(72) Inventors: Alexandros Manolakos, San Diego, CA (US); Gabi Sarkis, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 16/877,188

(22) Filed: May 18, 2020

(65) Prior Publication Data

US 2021/0021374 A1    Jan. 21, 2021

(30) Foreign Application Priority Data

Jul. 18, 2019  (GR) .............................. 20190100309

(51) Int. Cl.
*H04L 1/00* (2006.01)
*H04W 72/04* (2023.01)

(52) U.S. Cl.
CPC ......... *H04L 1/0071* (2013.01); *H04W 72/042* (2013.01)

(58) Field of Classification Search
None
See application file for complete search history.

(56) References Cited

U.S. PATENT DOCUMENTS

2021/0204260 A1\* 7/2021 Liu .................. H04W 72/1273

FOREIGN PATENT DOCUMENTS

| EP | 3675401 A1 | 7/2020 | |
| EP | 3691366 A1 | 8/2020 | |
| WO | WO-2019029528 A1 | 2/2019 | |
| WO | WO-2019064551 A1 \* | 4/2019 | ............ H04W 28/06 |

(Continued)

OTHER PUBLICATIONS

International Search Report and Written Opinion—PCT/US2020/041594—ISA/EPO—dated Nov. 3, 2020.

(Continued)

*Primary Examiner* — Christopher T Wyllie
(74) *Attorney, Agent, or Firm* — Qualcomm Incorporated

(57) ABSTRACT

Methods, systems, and devices for wireless communications are described in which a two-stage interleaving pattern may be provided for communication of coded information via a channel. The channel may have a channel bandwidth within a bandwidth part (BWP) of a total frequency bandwidth, and the two-stage interleaving pattern may provide a first interleaving pattern of resource blocks within an allocated set of user equipment (UE) resources and a second interleaving pattern of resource blocks within the BWP. The two-stage interleaving pattern may be based on the first interleaving pattern being initially applied to resource blocks within the allocated set of UE resources, and the second interleaving pattern being subsequently applied to resource blocks within the BWP. Signaling to indicate a type of interleaving to be applied to a communication may be provided in semi-static signaling, dynamic signaling, or combinations thereof.

28 Claims, 18 Drawing Sheets

(56) References Cited

FOREIGN PATENT DOCUMENTS

WO  WO-2019064551 A1  4/2019
WO  WO-2019095256 A1  5/2019

OTHER PUBLICATIONS

Qualcomm Incorporated: "DL/UL Resource Allocation", 3GPP Draft, 3GPP TSG-RAN WG1 Meeting AH 1801, R1-1800875, DL-UL-Resource Allocation, 3rd Generation Partnership Project (3GPP), Mobile Competence Centre, 650, Route Des Lucioles, F-06921, Sophia-Antipolis Cedex, France, vol. RAN WG1, No. Vancouver, Canada; Dec. 2, 2018-Dec. 6, 2018, Jan. 13, 2018 (Jan. 13, 2018), XP051385145, pp. 1-10, Retrieved from the Internet: URL: http://www.3gpp.org/ftp/tsg%5Fran/WG1%5FRL1/TSGR1%5FAH/NR%5FAH%5F1801/Docs/[retrieved on Jan. 13, 2018] Appendix I and II.

* cited by examiner

TWO-STAGE INTERLEAVING TECHNIQUES FOR WIRELESS COMMUNICATIONS

CROSS REFERENCE

The present Application for Patent claims the benefit of Greek Patent Application No. 20190100309 by MANOLAKOS et al., entitled "TWO-STAGE INTERLEAVING TECHNIQUES FOR WIRELESS COMMUNICATIONS," filed Jul. 18, 2019, assigned to the assignee hereof, and expressly incorporated by reference herein.

BACKGROUND

The following relates generally to wireless communications, and more specifically to two-stage interleaving techniques for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some deployments, UEs and base stations may use interleaving, in which contiguous portions one or more transmissions may be mapped to certain non-contiguous frequency resources, time resources, or combinations thereof. Such interleaving may enhance frequency diversity, time diversity, or both, of a transmission, which may enhance the likelihood of successful reception of a transmission at a UE or base station that is receiving the transmission. Enhanced techniques for increasing frequency diversity, time diversity, or both, may thus be desirable in order to further enhance the likelihood of successful reception of a transmission at a UE or base station that is receiving the transmission.

SUMMARY

The described techniques relate to improved methods, systems, devices, or apparatuses that support two-stage interleaving for wireless communications. Various described aspects provide for flexible frequency-domain and/or time-domain interleaving of resource blocks for communications between a base station and a user equipment (UE). Such interleaving may be performed within a bandwidth part (BWP) configured for such communications, within an allocated set of resources of the UE, or both. In some cases, a configurable interleaver design may enable communication devices to exploit diversity in a given channel (e.g., which may depend on the physical channel conditions, beamforming patterns, etc.). In some cases, a type of interleaving to be used for communications may be configured (e.g., by the base station or other wireless device in a wireless communications system) dynamically or semi-statically. The flexible configuration may depend on explicit signaling, implicit rules, or combinations thereof.

In some cases, a two-stage interleaving pattern may be provided for communication of coded information via a channel. The channel may have a channel bandwidth within a BWP of a total frequency bandwidth, and the two-stage interleaving pattern may provide a first interleaving pattern of resource blocks within an allocated set of UE resources and a second interleaving pattern of resource blocks within the BWP. In some cases, the allocated set of UE resources may span multiple time resources (e.g., symbols or slots) and the two-stage interleaving pattern may span such multiple time resources. In some cases, the two-stage interleaving pattern is based on the first interleaving pattern being initially applied to resource blocks within the allocated set of UE resources, and the second interleaving pattern being subsequently applied to resource blocks within the BWP.

In some cases, an indication of a type of interleaving applied to a communication may be provided semi-statically (e.g., via radio resource control (RRC) signaling), dynamically (e.g., in downlink control information (DCI)), or combinations thereof. In some examples, a flag that indicates two-stage interleaving is enabled may be provided semi-statically, and one or more control bits within DCI may indicate a particular two-stage interleaving pattern that is to be applied to a communication.

A method of wireless communications at a UE is described. The method may include determining a two-stage interleaving pattern for receiving coded information from a base station via a channel having a channel bandwidth within a BWP of a total frequency bandwidth, where the two-stage interleaving pattern indicates a first interleaving pattern of resource blocks within an allocated set of UE resources and a second interleaving pattern of resource blocks within the BWP, receiving the coded information via the channel, and decoding one or more resource blocks of the coded information based on the two-stage interleaving pattern.

An apparatus for wireless communications at a UE is described. The apparatus may include a processor, memory coupled with the processor, and instructions stored in the memory. The instructions may be executable by the processor to cause the apparatus to determine a two-stage interleaving pattern for receiving coded information from a base station via a channel having a channel bandwidth within a BWP of a total frequency bandwidth, where the two-stage interleaving pattern indicates a first interleaving pattern of resource blocks within an allocated set of UE resources and a second interleaving pattern of resource blocks within the BWP, receive the coded information via the channel, and decode one or more resource blocks of the coded information based on the two-stage interleaving pattern.

Another apparatus for wireless communications at a UE is described. The apparatus may include means for determining a two-stage interleaving pattern for receiving coded information from a base station via a channel having a channel bandwidth within a BWP of a total frequency bandwidth, where the two-stage interleaving pattern indicates a first interleaving pattern of resource blocks within an allocated set of UE resources and a second interleaving pattern of resource blocks within the BWP, receiving the coded information via the channel, and decoding one or more resource blocks of the coded information based on the two-stage interleaving pattern.

A non-transitory computer-readable medium storing code for wireless communications at a UE is described. The code may include instructions executable by a processor to determine a two-stage interleaving pattern for receiving coded information from a base station via a channel having a channel bandwidth within a BWP of a total frequency bandwidth, where the two-stage interleaving pattern indicates a first interleaving pattern of resource blocks within an allocated set of UE resources and a second interleaving pattern of resource blocks within the BWP, receive the coded information via the channel, and decode one or more resource blocks of the coded information based on the two-stage interleaving pattern.

In some examples of the method, apparatuses, and non-transitory computer-readable medium described herein, the two-stage interleaving pattern may be based on the first interleaving pattern being initially applied to resource blocks within the allocated set of UE resources, and the second interleaving pattern being subsequently applied to resource blocks within the BWP, and where the BWP spans a larger bandwidth than the channel bandwidth. Some examples of the method, apparatuses, and non-transitory computer-readable medium described herein may further include operations, features, means, or instructions for receiving, from the base station, an indication that the two-stage interleaving pattern is to be used for transmitting the coded information via the channel.

In some examples of the method, apparatuses, and non-transitory computer-readable medium described herein, the receiving the indication from the base station may include operations, features, means, or instructions for receiving, via RRC signaling, a two-stage interleaving flag that indicates two-stage interleaving is be enabled for downlink transmissions to the UE, and receiving, via downlink control information, a control bit that indicates the two-stage interleaving pattern is to be used for downlink transmissions to the UE in the allocated set of UE resources. In some examples of the method, apparatuses, and non-transitory computer-readable medium described herein, the control bit indicates that the two-stage interleaving pattern is to be used or that no interleaving is to be used for the downlink transmissions to the UE in the allocated set of UE resources. In some examples of the method, apparatuses, and non-transitory computer-readable medium described herein, the control bit indicates that the two-stage interleaving pattern is to be used or that only the second interleaving pattern is to be used for the downlink transmissions to the UE in the allocated set of UE resources.

In some examples of the method, apparatuses, and non-transitory computer-readable medium described herein, the control bit indicates that the two-stage interleaving pattern is to be used or that no interleaving is to be used for the downlink transmissions to the UE in the allocated set of UE resources when the downlink control information is transmitted to a set of UEs, and the control bit indicates that the two-stage interleaving pattern is to be used or that only the second interleaving pattern is to be used for the downlink transmissions to the UE in the allocated set of UE resources when the downlink control information is provided in a UE-specific transmission. In some examples of the method, apparatuses, and non-transitory computer-readable medium described herein, the downlink control information transmitted to a set of UEs provides physical downlink shared channel (PDSCH) information that may be scheduled by a physical downlink control channel (PDCCH) transmission that is scrambled by a system information radio network temporary identifier (SI-RNTI) of the UE or in a PDCCH transmission in a common search space.

In some examples of the method, apparatuses, and non-transitory computer-readable medium described herein, the control bit indicates that the two-stage interleaving pattern is to be used or that only the first interleaving pattern is to be used for the downlink transmissions to the UE in the allocated set of UE resources.

In some examples of the method, apparatuses, and non-transitory computer-readable medium described herein, the indication that the two-stage interleaving pattern is to be used for transmitting the coded information via the channel indicates whether the coded information is to have no interleaving, only the first interleaving pattern, only the second interleaving pattern, or the two-stage interleaving pattern.

In some examples of the method, apparatuses, and non-transitory computer-readable medium described herein, the allocated set of UE resources span two or more contiguous resource blocks in frequency. In some examples of the method, apparatuses, and non-transitory computer-readable medium described herein, the allocated set of UE resources may be PDSCH resources.

In some examples of the method, apparatuses, and non-transitory computer-readable medium described herein, the determining may include operations, features, means, or instructions for receiving a two-bit indicator in downlink control information that indicates the two-stage interleaving pattern is to be used for downlink transmissions to the UE in the allocated set of UE resources. In some examples of the method, apparatuses, and non-transitory computer-readable medium described herein, the two-bit indicator indicates, when the downlink control information is to be transmitted to a set of UEs, whether no interleaving is to be used, whether only the second interleaving pattern is to be used, or whether the two-stage interleaving pattern is to be used for the downlink transmissions to the UE in the allocated set of UE resources. In some examples of the method, apparatuses, and non-transitory computer-readable medium described herein, a first bit of the two-bit indicator indicates whether no interleaving is to be used, or whether only the second interleaving pattern is to be used for the downlink transmissions to the UE in the allocated set of UE resources. In some examples of the method, apparatuses, and non-transitory computer-readable medium described herein, the two-bit indicator indicates, when the downlink control information is provided in a UE-specific transmission, whether no interleaving is to be used, whether only the first interleaving pattern is to be used, whether only the second interleaving pattern is to be used, or whether the two-stage interleaving pattern is to be used for the downlink transmissions to the UE in the allocated set of UE resources. In some examples of the method, apparatuses, and non-transitory computer-readable medium described herein, a first bit of the two-bit indicator corresponds to a dynamic interleaving indicator bit, and a second bit of the two-bit indicator corresponds to a dynamic physical resource block group (PRG) indication bit.

A method of wireless communications at a base station is described. The method may include determining a two-stage interleaving pattern for transmitting coded information to a UE via a channel having a channel bandwidth within a BWP of a total frequency bandwidth, where the two-stage interleaving pattern indicates a first interleaving pattern for resource blocks within an allocated set of UE resources and a second interleaving pattern for resource blocks within the BWP, interleaving one or more resource blocks of the coded information based on the two-stage interleaving pattern, and transmitting the interleaved resource blocks via the channel.

An apparatus for wireless communications at a base station is described. The apparatus may include a processor, memory coupled with the processor, and instructions stored in the memory. The instructions may be executable by the processor to cause the apparatus to determine a two-stage interleaving pattern for transmitting coded information to a UE via a channel having a channel bandwidth within a BWP of a total frequency bandwidth, where the two-stage interleaving pattern indicates a first interleaving pattern for resource blocks within an allocated set of UE resources and a second interleaving pattern for resource blocks within the BWP, interleave one or more resource blocks of the coded information based on the two-stage interleaving pattern, and transmit the interleaved resource blocks via the channel.

Another apparatus for wireless communications at a base station is described. The apparatus may include means for determining a two-stage interleaving pattern for transmitting coded information to a UE via a channel having a channel bandwidth within a BWP of a total frequency bandwidth, where the two-stage interleaving pattern indicates a first interleaving pattern for resource blocks within an allocated set of UE resources and a second interleaving pattern for resource blocks within the BWP, interleaving one or more resource blocks of the coded information based on the two-stage interleaving pattern, and transmitting the interleaved resource blocks via the channel.

A non-transitory computer-readable medium storing code for wireless communications at a base station is described. The code may include instructions executable by a processor to determine a two-stage interleaving pattern for transmitting coded information to a UE via a channel having a channel bandwidth within a BWP of a total frequency bandwidth, where the two-stage interleaving pattern indicates a first interleaving pattern for resource blocks within an allocated set of UE resources and a second interleaving pattern for resource blocks within the BWP, interleave one or more resource blocks of the coded information based on the two-stage interleaving pattern, and transmit the interleaved resource blocks via the channel.

In some examples of the method, apparatuses, and non-transitory computer-readable medium described herein, the two-stage interleaving pattern may be based on the first interleaving pattern being initially applied to resource blocks within the allocated set of UE resources, and the second interleaving pattern being subsequently applied to resource blocks within the BWP, and where the BWP spans a larger bandwidth than the channel bandwidth.

Some examples of the method, apparatuses, and non-transitory computer-readable medium described herein may further include operations, features, means, or instructions for transmitting, to the UE, an indication that the two-stage interleaving pattern is to be used for transmitting the coded information via the channel. In some examples of the method, apparatuses, and non-transitory computer-readable medium described herein, the transmitting the indication to the UE may include operations, features, means, or instructions for transmitting, via RRC signaling, a two-stage interleaving flag that indicates two-stage interleaving is enabled for downlink transmissions to the UE, and transmitting, via downlink control information, a control bit that indicates the two-stage interleaving pattern is to be used for downlink transmissions to the UE in the allocated set of UE resources.

In some examples of the method, apparatuses, and non-transitory computer-readable medium described herein, the control bit indicates that the two-stage interleaving pattern is to be used or that no interleaving is to be used for the downlink transmissions to the UE in the allocated set of UE resources. In some examples of the method, apparatuses, and non-transitory computer-readable medium described herein, the control bit indicates that the two-stage interleaving pattern is to be used or that only the second interleaving pattern is to be used for the downlink transmissions to the UE in the allocated set of UE resources.

In some examples of the method, apparatuses, and non-transitory computer-readable medium described herein, the control bit indicates that the two-stage interleaving pattern is to be used or that no interleaving is to be used for the downlink transmissions to the UE in the allocated set of UE resources when the downlink control information is transmitted to a set of UEs, and the control bit indicates that the two-stage interleaving pattern is to be used or that only the second interleaving pattern is to be used for the downlink transmissions to the UE in the allocated set of UE resources when the downlink control information is provided in a UE-specific transmission. In some examples of the method, apparatuses, and non-transitory computer-readable medium described herein, the downlink control information transmitted to a set of UEs provides PDSCH information that is scheduled by a PDCCH transmission that is scrambled by a system information radio network temporary identifier (SI-RNTI) of the UE or in a PDCCH transmission in a common search space.

In some examples of the method, apparatuses, and non-transitory computer-readable medium described herein, the control bit indicates that the two-stage interleaving pattern is to be used or that only the first interleaving pattern is to be used for the downlink transmissions to the UE in the allocated set of UE resources. In some examples of the method, apparatuses, and non-transitory computer-readable medium described herein, the indication that the two-stage interleaving pattern is to be used for transmitting the coded information via the channel indicates whether the coded information may have no interleaving, only the first interleaving pattern, only the second interleaving pattern, or the two-stage interleaving pattern.

In some examples of the method, apparatuses, and non-transitory computer-readable medium described herein, the allocated set of UE resources span two or more contiguous resource blocks in frequency. In some examples of the method, apparatuses, and non-transitory computer-readable medium described herein, the allocated set of UE resources may be PDSCH resources.

Some examples of the method, apparatuses, and non-transitory computer-readable medium described herein may further include operations, features, means, or instructions for transmitting a two-bit indicator in downlink control information to the UE, where the two-bit indicator indicates the two-stage interleaving pattern is to be used for downlink transmissions to the UE in the allocated set of UE resources. In some examples of the method, apparatuses, and non-transitory computer-readable medium described herein, the two-bit indicator indicates, when the downlink control information is to be transmitted to a set of UEs, whether no interleaving is to be used, whether only the second interleaving pattern is to be used, or whether the two-stage interleaving pattern is to be used for the downlink transmissions to the UE in the allocated set of UE resources.

In some examples of the method, apparatuses, and non-transitory computer-readable medium described herein, when the downlink control information is transmitted to a set of UEs, a first bit of the two-bit indicator indicates whether no interleaving is to be used, or whether only the second interleaving pattern is to be used for the downlink transmissions to the UE in the allocated set of UE resources. In some examples of the method, apparatuses, and non-transitory computer-readable medium described herein, the two-bit indicator indicates, when the downlink control information is provided in a UE-specific transmission, whether no interleaving is to be used, whether only the first interleaving pattern is to be used, whether only the second interleaving pattern is to be used, or whether the two-stage interleaving pattern is to be used for the downlink transmissions to the UE in the allocated set of UE resources. In some examples of the method, apparatuses, and non-transitory computer-readable medium described herein, a first bit of the two-bit indicator corresponds to a dynamic interleaving indicator bit, and a second bit of the two-bit indicator corresponds to a dynamic PRG indication bit.

DETAILED DESCRIPTION

Figure 1:
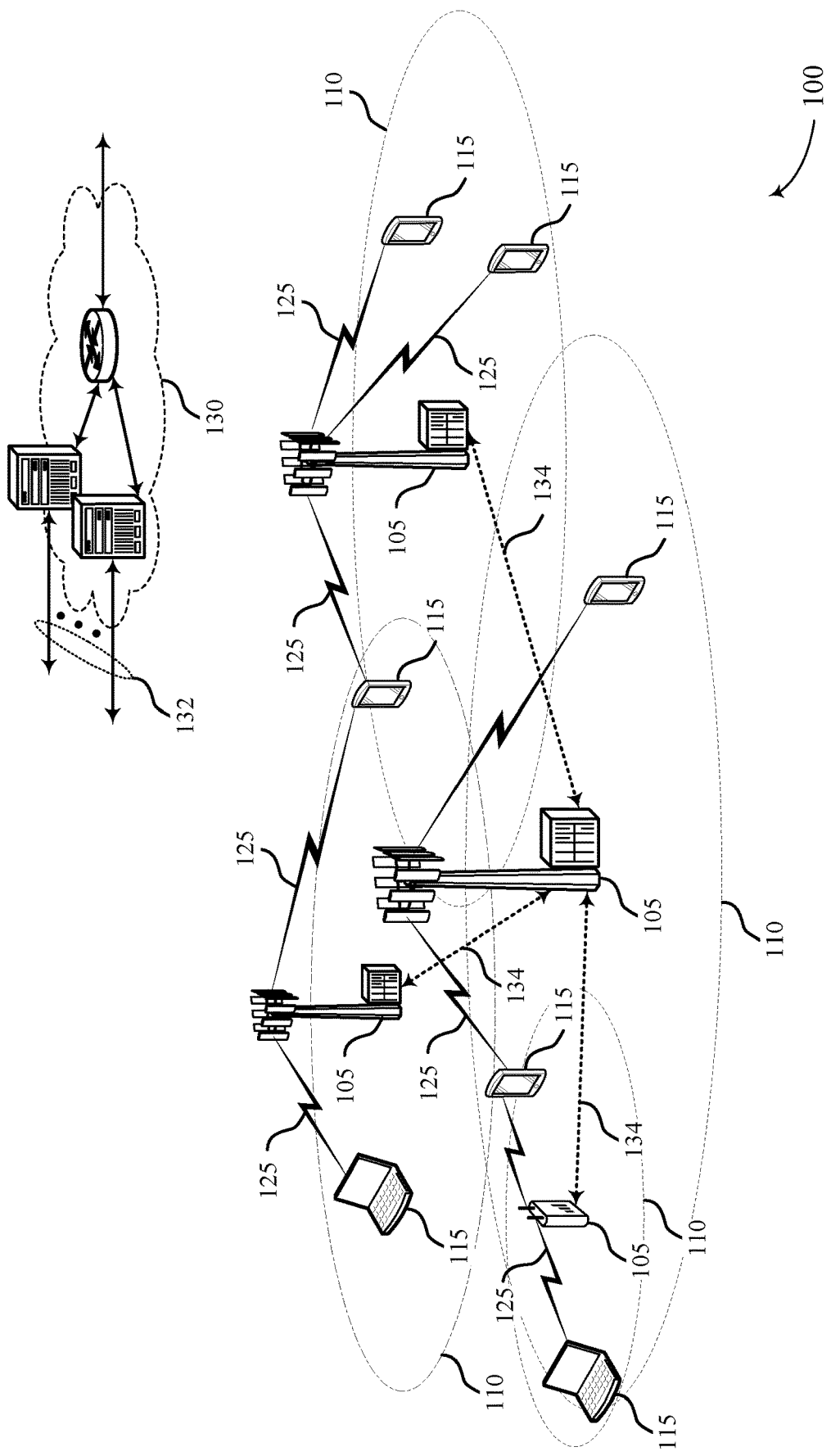
FIG. 1 illustrates an example of a wireless communications system that supports two-stage interleaving techniques for wireless communications in accordance with aspects of the present disclosure.

Various aspects of the present disclosure provide interleaving techniques in which contiguous portions one or more transmissions may be mapped to certain non-contiguous frequency resources, time resources, or combinations thereof, according to one or more interleaving patterns or mapping of virtual resource blocks (VRBs) to physical resource blocks (PRBs). Such interleaving may enhance frequency diversity, time diversity, or both, of a transmission, which may enhance the likelihood of successful reception of a transmission at a user equipment (UE) or base station that is receiving the transmission. Interleaving may be configured via semi-static communications (e.g., via radio resource control (RRC) signaling), via dynamic communications (e.g., via downlink control information (DCI) provided to a UE that indicates a resource allocation for the UE), or combinations thereof. Flexible interleaving may include in-allocation interleaving, in-bandwidth part (BWP) interleaving, or two-stage interleaving with both in-allocation interleaving and in-BWP interleaving. An interleaving configuration determination may be made by a base station or some other network entity and explicitly signaled to another device. Interleaving may be enabled (e.g., or disabled) under certain conditions.

By way of example, some wireless communications systems may employ one or more forms of interleaving (e.g., time and/or frequency interleaving). Interleaving may improve performance of the system by exploiting diversity over a frequency-selective channel, diversity over a fast fading channel, interference diversity over frequency and/or time, etc. Further, some systems (e.g., New Radio (NR) systems) may operate in frequency ranges that may utilize beamformed transmissions between wireless devices. For example, some frequency ranges (e.g., millimeter wave (mmW), sub-6 GHz, etc.) may be associated with increased signal attenuation (e.g., path loss). As a result, signal processing techniques, such as beamforming, may be used to combine energy coherently and overcome the path losses. However, beamforming may alter the channel conditions experienced by the signal (e.g., may affect the coherence bandwidth of the channel) and improved techniques supporting flexible interleaving based on a wide variety of applications and beamforming characteristics may be desired, and may provide enhanced likelihood of successful transmissions. The use of a configurable interleaver to provide flexible interleaving may benefit the system. For instance, in some systems (e.g., systems in which the channel conditions may vary based on various parameters), interleaving may be configured (e.g., dynamically/semi-statically) based at least in part on the given communication parameters (e.g., beamforming parameters, signal-to-noise ratio (SNR), etc.). In some cases, the determination may be made by a base station (e.g., or some other coordinating entity within the network) and explicitly signaled to another device (e.g., a UE). In some cases, the interleaving may be enabled (e.g., or disabled) under certain conditions (e.g., based on channel conditions, to conserve energy, to reduce latency, etc.).

In some cases, a two-stage interleaving pattern may be provided for communication of coded information via a channel. The channel may have a channel bandwidth within a BWP of a total frequency bandwidth, and the two-stage interleaving pattern may provide a first interleaving pattern of resource blocks within an allocated set of UE resources and a second interleaving pattern of resource blocks within the BWP. In some cases, the allocated set of UE resources may span multiple time resources (e.g., symbols or slots) and the two-stage interleaving pattern may span such multiple time resources. In some cases, the two-stage interleaving pattern is based on the first interleaving pattern being initially applied to resource blocks within the allocated set of UE resources, and the second interleaving pattern being subsequently applied to resource blocks within the BWP. In some cases, two-stage interleaving may be applied at a PRB-level (e.g., alternatively or in addition to code block (CB)-level, bit-level, tone-level, or tone-group-level interleaving). Two-stage interleaving at the PRB-level may provide enhanced diversity within allocated resources and across BWP resources, while providing relatively efficient processing performance, relative to single stage PRB interleaving. Further, flexibility in selection a type of interleaving to be performed may further enhance system efficiency by allowing for appropriate interleaving based on channel conditions, quality of service requirements, and the like.

In some cases, an indication of a type of interleaving applied to a communication may be provided semi-statically (e.g., via radio resource control (RRC) signaling), dynamically (e.g., in downlink control information (DCI)), or combinations thereof. In some examples, a flag that indicates two-stage interleaving is enabled may be provided semi-statically, and one or more control bits within DCI may indicate a particular two-stage interleaving pattern that is to be applied to a communication.

Aspects of the disclosure are initially described in the context of a wireless communications system. Various examples of interleaving patterns and techniques are then discussed. Aspects of the disclosure are further illustrated by and described with reference to apparatus diagrams, system diagrams, and flowcharts that relate to two-stage interleaving techniques for wireless communications.

FIG. 1 illustrates an example of a wireless communications system 100 that supports two-stage interleaving techniques for wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, communications between UEs 115 and base stations 105 may use two-stage interleaving. In some cases, a two-stage interleaving pattern may be provided for communication of coded information via a channel. The channel may have a channel bandwidth within a BWP of a total frequency bandwidth, and the two-stage interleaving pattern may provide a first interleaving pattern of resource blocks within an allocated set of UE resources and a second interleaving pattern of resource blocks within the BWP. In some cases, the two-stage interleaving pattern is based on the first interleaving pattern being initially applied to resource blocks within the allocated set of UE resources, and the second interleaving pattern being subsequently applied to resource blocks within the BWP. An indication of a type of interleaving applied to a communication may be provided by a base station 105 to a UE semi-statically (e.g., via RRC signaling), dynamically (e.g., in DCI), or combinations thereof. In some examples, a flag that indicates two-stage interleaving is enabled may be provided in RRC signaling, and one or more control bits within DCI may indicate a particular two-stage interleaving pattern that is to be applied to a communication.

Figure 2:
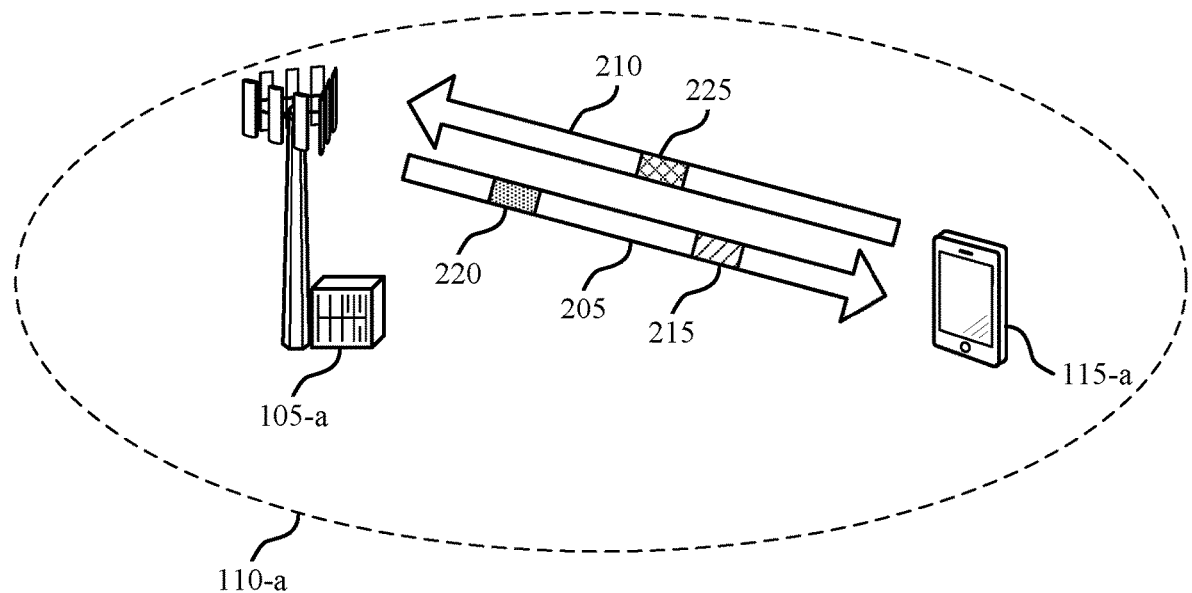
FIG. 2 illustrates an example of a portion of a wireless communications system that supports two-stage interleaving techniques for wireless communications in accordance with aspects of the present disclosure.

FIG. 2 illustrates an example of a wireless communications system 200 that supports two-stage interleaving techniques for wireless communications in accordance with aspects of the present disclosure. In some examples, wireless communications system 200 may implement aspects of wireless communications system 100. Wireless communications system 200 includes a base station 105-a with associated coverage area 110-a, and a UE 115-a, each of which may be an example of the corresponding device described with reference to FIG. 1. Aspects of the following examples are described using downlink transmissions, though the techniques may be extended to uplink transmissions without departing from the scope of the present disclosure.

In this example, downlink transmissions 205 from the base station 105-a to the UE 115-a may include, among other transmissions, control information 215 and PDSCH 220 transmissions. Uplink transmissions 210 from the UE 115-a to the base station 105-a may include, among other transmissions, a UE capability indication 225 that may provide various UE 115-a capabilities which may include a capability for two-stage interleaving at the RB-level. In some examples, wireless communications system 200 may operate in frequency ranges that are associated with beamformed transmissions (e.g., using mmW frequency ranges, or other frequency ranges associated with signal attenuation as described above with reference to FIG. 1). As a result, signal processing techniques, such as beamforming, may be used to combine energy coherently and overcome path losses.

Wireless communications system 200 may employ various forms of interleaving (e.g., data interleaving, frequency interleaving, etc.) to improve system performance. These performance improvements may be the result of exploiting diversity over a frequency-selective channel, diversity over a fast fading channel, interference diversity over frequency, interference diversity over time, etc. Such interleaving may include frequency-only interleaving, or both frequency and time interleaving. As used in aspects of the present disclosure, diversity may refer to differences in transmission environments (e.g., different frequency-dependent fading, different path lengths, etc.). Many communication environments are not memoryless, such that errors may tend to occur in groups. As an example, for a communication in which UE 115-a is moving, some initial portion of a downlink transmission 205 may not be successfully received and decoded at the UE 115-a (e.g., due to some transient signal blockage). Additionally or alternatively, some portion of the downlink transmissions 205 (e.g., PDSCH transmission 220) associated with a given frequency range may be absent from a received signal at the UE 115-a (e.g., because of high path loss within the frequency range, interference with another signal, etc.). Accordingly, such communications may benefit from the use of interleaving, such that the deleterious effects of transmission obstacles similar to those described above may be spread across multiple regions of the communication resources or otherwise mitigated.

According to various aspects of the present disclosure, base station 105-a and UE 115-a may employ aspects of a configurable interleaver that may employ no interleaving, in-allocation interleaving, in-BWP interleaving, or two-stage interleaving with both in-allocation and in-BWP interleaving, as described herein. In some cases, control information 215 may provide an indication of a type of interleaving that is to be used for a communication (e.g., PDSCH 220 transmission). Such a configurable interleaver may be designed to exploit the diversity in the specific channel as determined by the physical channel conditions. The gain of frequency domain interleaving may depend on a number of factors, including delay spread of the channel, allocated bandwidth, CB size, modulation order SNR, number of layers, etc.

In some cases, a set of virtual resource blocks (VRBs) associated with PDSCH 220 transmission may be mapped according to a VRB-to-PRB mapping that provides frequency interleaving, or both frequency and time interleaving, of contiguous VRBs to PRBs. A configurable interleaver as discussed herein may use single stage interleaving, two-stage interleaving, or no interleaving, for the VRB-to-PRB mapping as will be discussed in more detail with reference to FIGS. 3 through 6.

Figure 3:
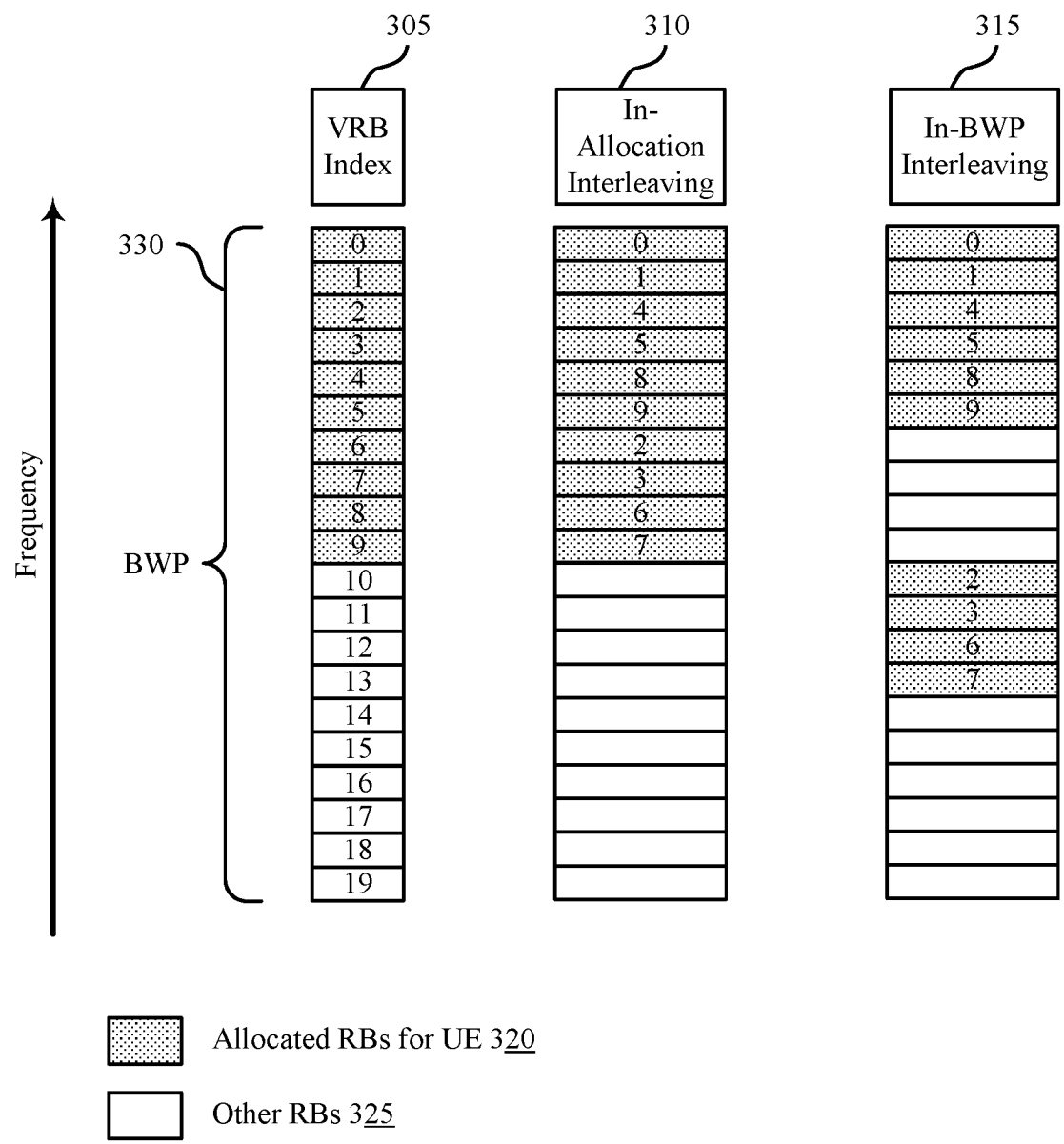
FIG. 3 illustrates an example of in-allocation and in-BWP interleaving patterns for wireless communications in accordance with aspects of the present disclosure.

FIG. 3 illustrates an example of in-allocation and in-BWP interleaving patterns 300 for wireless communications in accordance with aspects of the present disclosure. In some examples, in-allocation and in-BWP interleaving patterns 300 may implement aspects of wireless communications system 100 or 200.

In this example, a VRB index 305 is provided with a number of indexed resource blocks, some or all of which may be allocated for communications with a UE (e.g., in a PDSCH allocation for the UE). Each resource block (VRB or PRB), in NR systems, may include 12 consecutive subcarriers in the frequency domain, and the interleaving patterns discussed herein may be at an RB-level. In some cases, a base station may configure a BWP 330 for communications with UEs. Such techniques may provide for reduced device power consumption, through a UE being active on a wide bandwidth in case of bursty traffic for a relatively short time, while being active on a narrow bandwidth at other times, in a technique that is referred to as bandwidth adaptation in which BWPs may be used to selectively adapt communications bandwidths. A BWP 330 may be a subset of contiguous RBs on a carrier, with up to four BWPs being configurable at the UE for communications and where one BWP is active per transmission direction. Thus, the UE can receive on a narrow BWP and, when needed the network can dynamically inform the UE to switch to a wider bandwidth for reception.

In this example, the base station may configure BWP 330 for communications with a number of UEs, in which each UE may communicate using one or more channels within the BWP 330. In the example of FIG. 3, VRBs zero through nine may be allocated for a transmission to a UE (i.e. the UE allocation uses one-half of the RBs in BWP 330). An in-allocation interleaving 310 may be provided in which a VRB-to-PRB mapping interleaves the VRBs within the allocated portion of the BWP 330. Thus, in this example, the interleaved RBs occupy a same set of frequency resources at the VRBs. In this example, an in-BWP interleaving 315 may also be provided in which VRB-to-PRB mapping interleaves the VRBs within the BWP 330, which extends outside of the allocated portion of the BWP 330 associated with the allocated VRBs.

In both in-allocation interleaving 310 and in-BWP interleaving 315, VRB-to-PRB interleaved mapping provides distributed codeblocks (CBs) across frequency. In-allocation interleaving 310 may result in relatively smaller gains since CBs are only distributed along two sub-bands that are diverse in frequency, while in-BWP interleaving 315 may provide relatively larger gains due to larger frequency diversity. However, in-BWP interleaving 315 may limit the interleaving ability of multiple UEs that have different BWP configurations. Further, in-BWP interleaving may preclude coexistence of different UEs within a BWP 330 switching BWPs for power savings. Thus, a configurable interleaver as discussed herein may beneficially provide in-allocation interleaving 310, in-BWP interleaving 315, or two-stage interleaving as discussed in FIGS. 4 through 6, and the type of interleaving may be selected based on current conditions of UEs that are being served by the base station.

Figure 4:
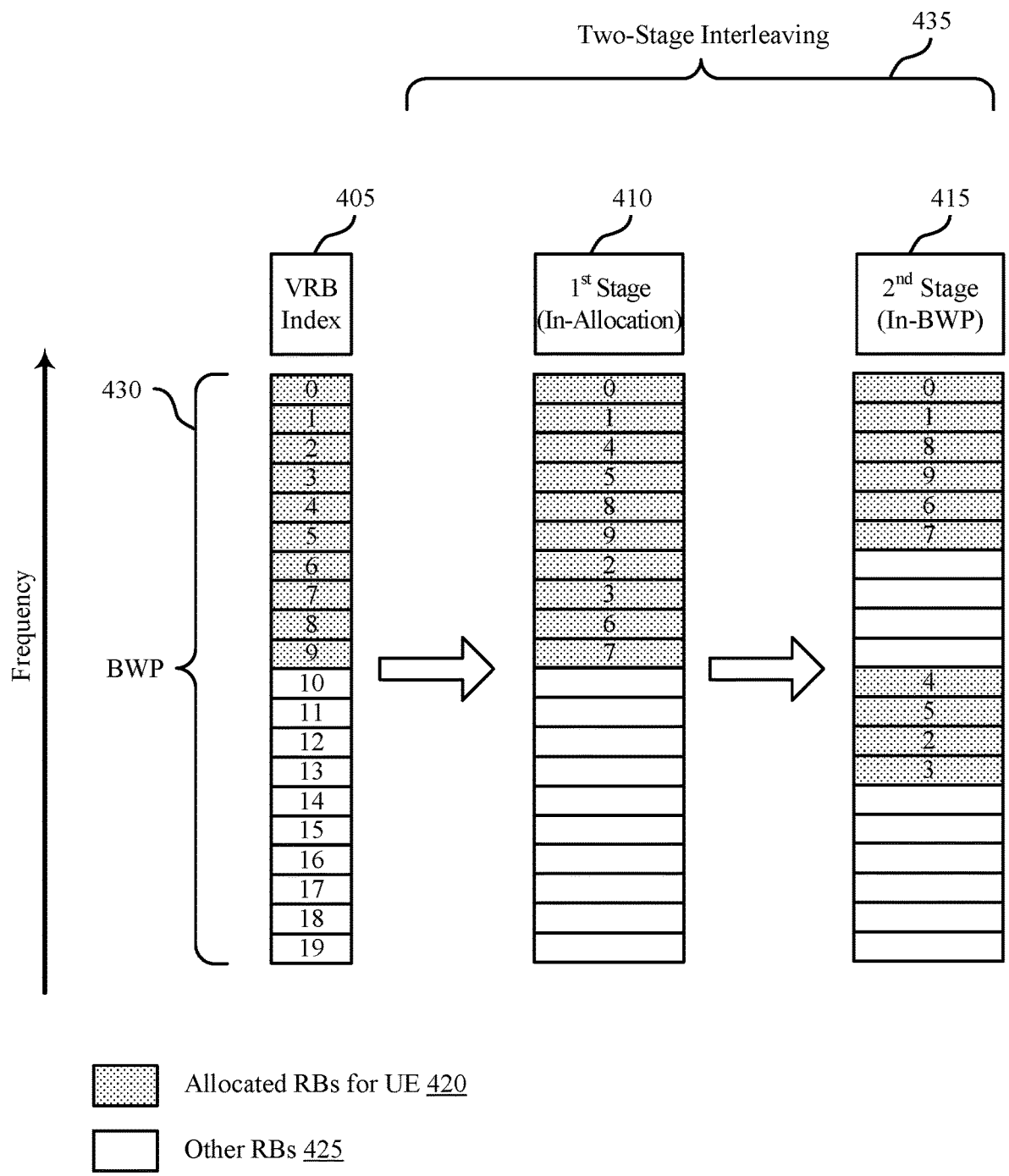
FIGS. 4 through 6 illustrate examples of two-stage interleaving patterns that supports two-stage interleaving techniques for wireless communications in accordance with aspects of the present disclosure.

FIG. 4 illustrates an example of a two-stage interleaving pattern 400 that supports two-stage interleaving techniques for wireless communications in accordance with aspects of the present disclosure. In some examples, two-stage interleaving pattern 400 may implement aspects of wireless communications system 100 or 200. In this example, a VRB index 405 is provided with a number of indexed resource blocks, some or all of which may be allocated for communications with a UE (e.g., in a PDSCH allocation for the UE). In this example, two-stage interleaving 435 may be implemented for communications between the UE and base station, with a first stage 410 interleaving of allocated RBs 420 for the UE. After the first stage 410 interleaving, a second stage 415 interleaving is performed on the interleaved RBs from the first stage interleaving 410. In this example, the first stage interleaving 410 provides in-allocation interleaving (e.g., based on VRB-to-PRB mapping within the allocated RBs 420 such as illustrated in FIG. 4), and the second stage interleaving 415 provides in-BWP interleaving within BWP 430 (e.g., based on VRB-to-PRB mapping provided for in-BWP interleaving where allocated RBs 420 are interleaved with other RBs 425) such as illustrated in FIG. 4.

Figure 5:
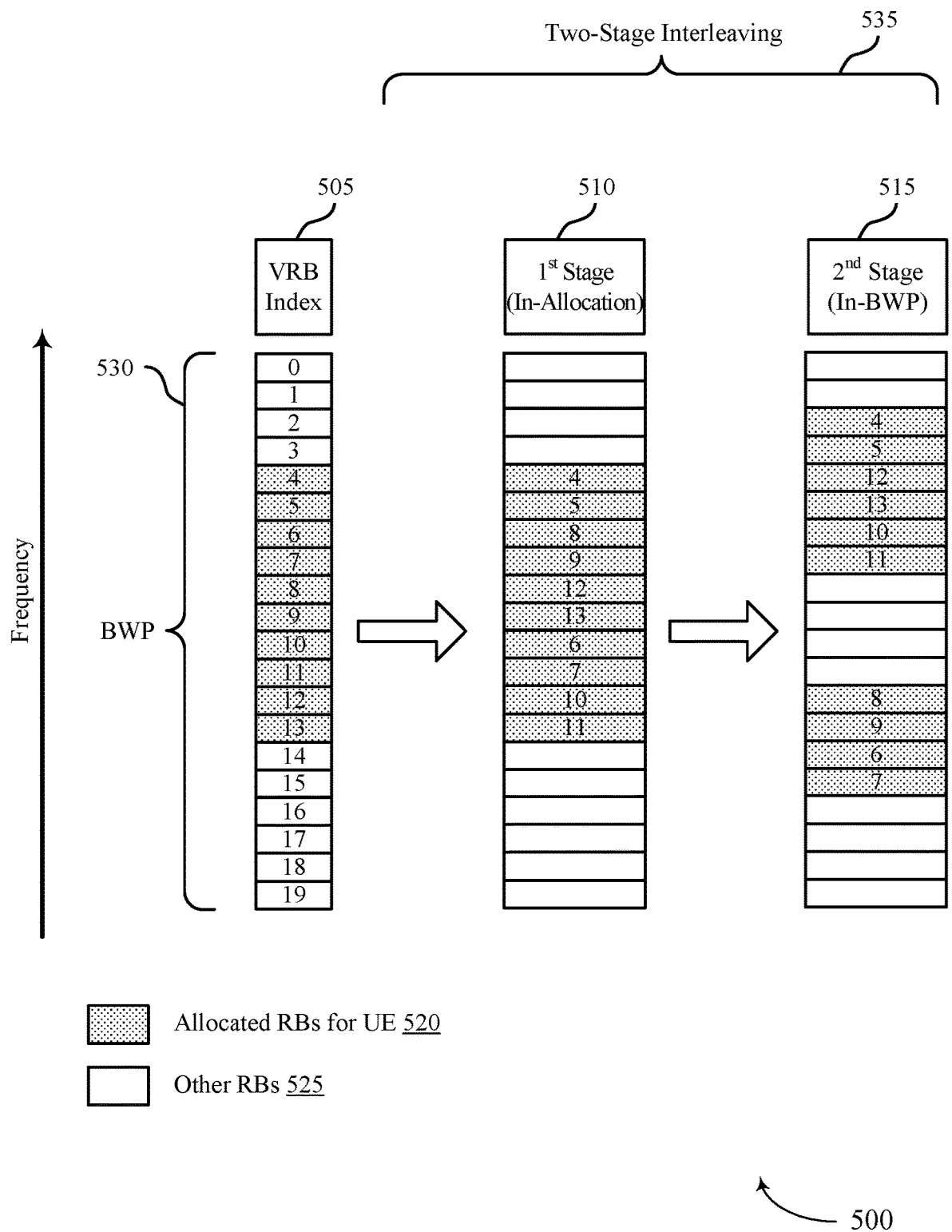
Figure 6:
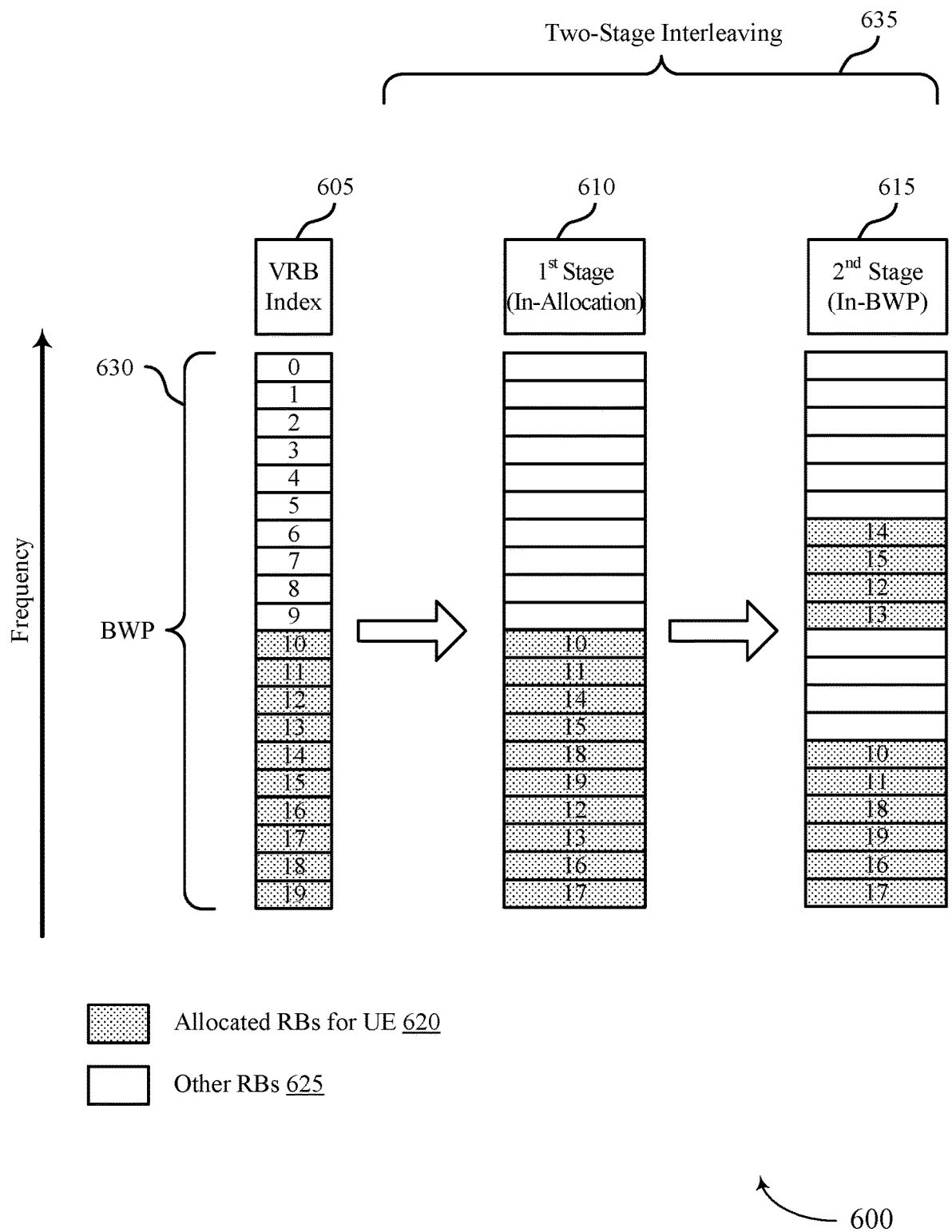

FIG. 5 and FIG. 6 illustrate other examples of two-stage interleaving patterns 500 and 600, respectively. In some examples, two-stage interleaving patterns 500 and 600 may implement aspects of wireless communications system 100 or 200. In the example of FIG. 5, VRB index 505 includes contiguous allocated RBs 520 for the UE that span a middle portion of BWP 530. In this example, two-stage interleaving 535 includes first stage 510 interleaving based on an in-allocation VRB-to-PRB mapping, and second stage 515 interleaving based on in-BWP RB mapping in which allocated RBs 520 are interleaved with other RBs 525 within the BWP 530 but outside of the bandwidth of the allocated RBs 520. Similarly, in the example of FIG. 6, VRB index 605 includes contiguous allocated RBs 620 for the UE that span upper RB indices of BWP 630. In this example, two-stage interleaving 635 includes first stage 610 interleaving based on an in-allocation VRB-to-PRB mapping, and second stage 615 interleaving based on in-BWP RB mapping in which allocated RBs 620 are interleaved with other RBs 625 within the BWP 630 but outside of the bandwidth of the allocated RBs 620.

As discussed herein, in some cases a configurable interleaver may be provided that supports configurability between various options for VRB-to-PRB interleaving, such as no Interleaving at all, only in-BWP Interleaving, only in-allocation interleaving, or two-stage interleaving with both in-allocation and in-BWP interleaving (e.g., as illustrated in FIGS. 4 through 6). In some cases, the two-stage interleaving with both in-allocation and in-BWP interleaving may be selected for continuous allocations of RBs for a UE. For example, some wireless communications systems (e.g., NR systems) may use different types of resource allocations in DCI, such as Type-0 allocations in which allocated frequency resources may be non-contiguous, and Type-1 allocations in which allocated frequency resources are contiguous. Signaling for a Type-1 allocation requires fewer DCI bits, at the cost of signaling a contiguous allocation to the UE. Thus, in-allocation interleaving of a Type-1 allocation results in interleaving within the contiguous allocation, and frequency diversity gains from using RBs outside of the contiguous allocation may be unrealized. Further, in-BWP interleaving of a contiguous Type-1 allocation may result in contiguous CBs within the RBs to remain contiguous following the in-BWP interleaving. Thus, when two-stage interleaving is selected, the resource allocation may be provided with lower overhead that results from the fewer DCI bits for a Type-1 allocation (relative to a type-0 allocation), while also providing enhanced frequency diversity by spreading the allocation across the whole BWP with frequency interleaving across contiguous CBs. Such frequency diversity also may be achieved by a base station providing a Type-0 allocation (that is non-contiguous across the BWP) and in-allocation interleaving, but such signaling consumes more overhead due to the increased number of DCI bits used for signaling the Type-0 allocation.

In some cases, two-stage interleaving may be provided for downlink transmissions but not uplink transmissions, such as if RF exposure thresholds would be exceeded for uplink transmissions (e.g., maximum permissible exposure (MPE) thresholds). In some cases, a base station may configure a UE (e.g., via semi-static RRC signaling) with an RRC flag that indicates in-allocation interleaving is ON, then the base station may provide an indication in DCI (e.g., a dynamic 1-bit indication) that indicates a type of interleaving that is to be applied to a communication.

In some cases, the indication in the DCI (when the RRC flag for in-allocation interleaving is ON) may indicate a type of interleaving based on a set of predefined rules. In a first case, the one-bit indication in the DCI may be interpreted as "No-Interleaving" (e.g., the bit is set to 0), or as "Both In-Allocation and In-BWP Interleaving" (i.e., two-stage interleaving based on the bit being set to 1). In a second case, the one-bit indication in the DCI may be interpreted as either "In-BWP Interleaving" (e.g., the bit is set to 0) or "Both In-Allocation & In-BWP Interleaving" (e.g., the bit is set to 1). In a third case, the option in the first case may be used for PDSCH scheduled by PDCCH scrambled by a system information radio network temporary identifier (SI-RNTI), or PDSCH scheduled by PDCCH in a common search space (CSS), whereas the option for the second case may be used for all remaining PDSCH. In a fourth case, the one-bit indication in the DCI may be interpreted as "In-Allocation Interleaving" (e.g., the bit is set to 0), or "Both In-Allocation & In-BWP Interleaving" (e.g., the bit is set to 0). In some cases, when "In-Allocation Interleaving" is OFF or not configured (e.g., in semi-static RRC signaling), the 1-bit DCI indicator is interpreted to indicate "No-Interleaving" or "In-BWP Interleaving." As used herein, in-allocation interleaving refers to any interleaving happening within the assigned data allocation across frequency, or time, or both frequency/time, without resulting in change in the physical resource footprint.

In other cases, the indication in the DCI may be provided by more than one bit. For example, a two-bit indicator may be provided. In one example, such an indication may provide, for PDSCH scheduled by PDCCH scrambled by SI-RNTI, or PDSCH scheduled by PDCCH in Common Search Space (CSS) the following:
  00: non-interleaving
  01: In-BWP Interleaving
  10: In-BWP Interleaving
  11: Both In-BWP and In-Allocation Interleaving.
In other cases, only one bit of the DCI indication may be used with an interpretation of either "non-interleaving" or "In-BWP Interleaving." In all other cases of PDSCH scheduling, the two-bit indication in DCI may provide the following:
  00: non-interleaving
  01: In-BWP Interleaving
  10: In-Allocation Interleaving
  11: Both In-BWP and In-Allocation Interleaving.

In some cases, in order to maintain a same DCI length as currently provided, the second bit in the DCI used for this mode of operation may be a PRG dynamic indication bit. In such cases, the UE may be RRC-configured for whether to combine the VRB-to-PRB bit with the PRG indication bit to a new two-bit VRB-2-PRB bitfield. In such cases, if the UE does not support dynamic PRG indication (e.g., as indicated in a UE capability indication), then the two-stage VRB-to-PRB interleaving is not supported either.

Figure 7:
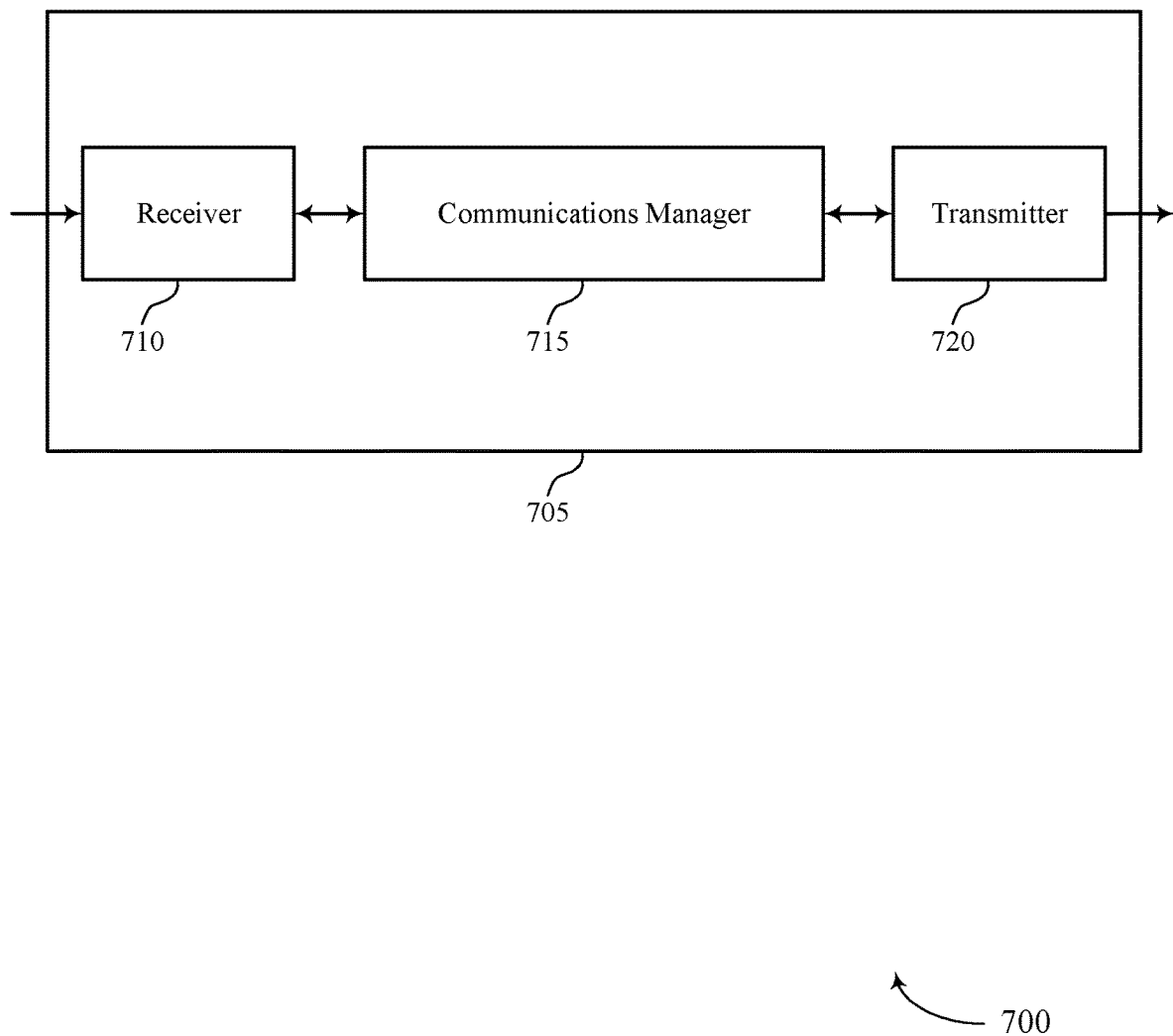
FIGS. 7 and 8 show block diagrams of devices that support two-stage interleaving techniques for wireless communications in accordance with aspects of the present disclosure.

FIG. 7 shows a block diagram 700 of a device 705 that supports two-stage interleaving techniques for wireless communications in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to two-stage interleaving techniques for wireless communications, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may determine a two-stage interleaving pattern for receiving coded information from a base station via a channel having a channel bandwidth within a bandwidth part of a total frequency bandwidth, where the two-stage interleaving pattern indicates a first interleaving pattern of resource blocks within an allocated set of UE resources and a second interleaving pattern of resource blocks within the bandwidth part, receive the coded information via the channel, and decode one or more resource blocks of the coded information based on the two-stage interleaving pattern. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
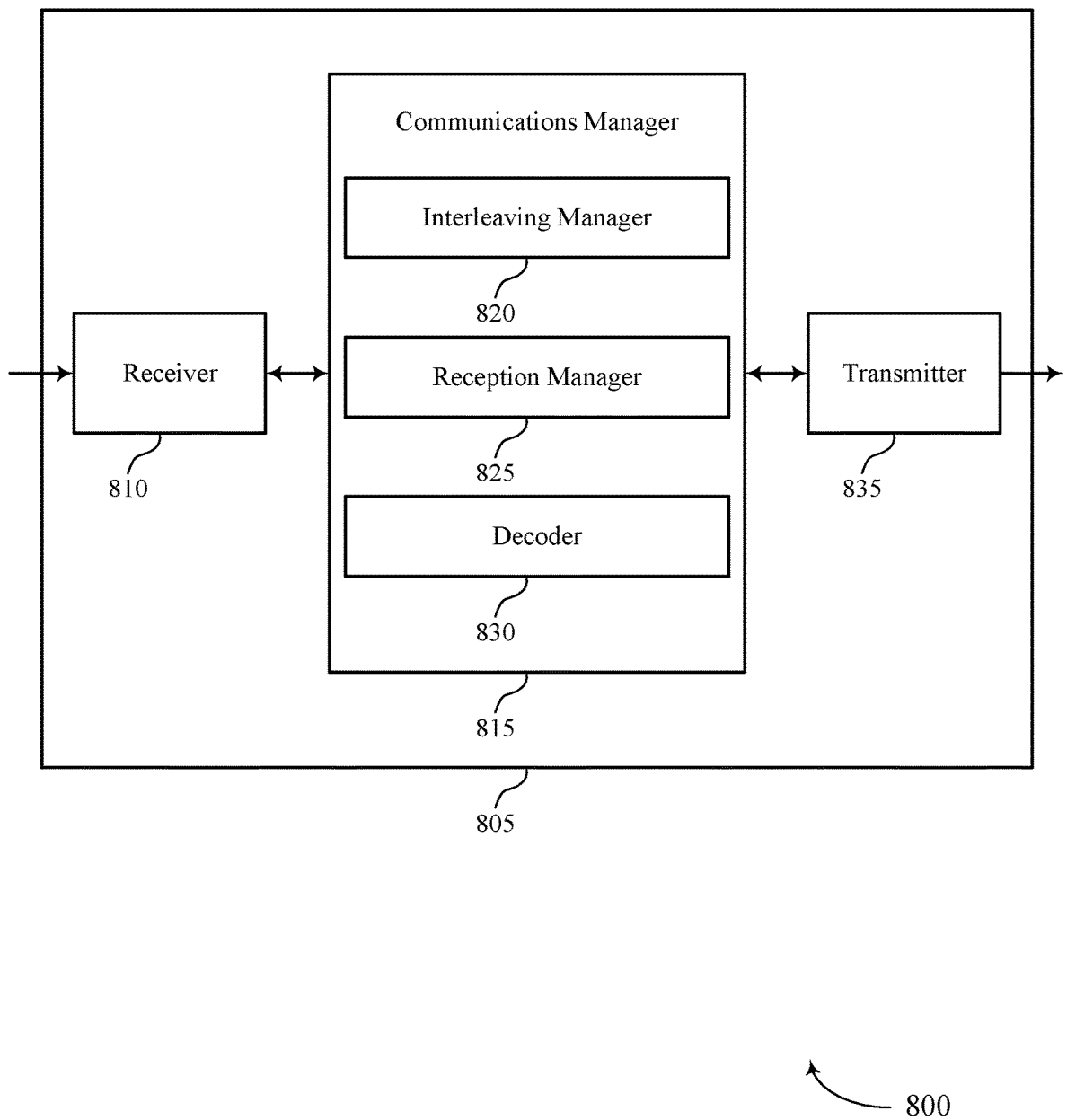

FIG. 8 shows a block diagram 800 of a device 805 that supports two-stage interleaving techniques for wireless communications in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to two-stage interleaving techniques for wireless communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an interleaving manager 820, a reception manager 825, and a decoder 830. The communications manager 815 may be an example of aspects of the communications manager 1010 described herein.

The interleaving manager 820 may determine a two-stage interleaving pattern for receiving coded information from a base station via a channel having a channel bandwidth within a bandwidth part of a total frequency bandwidth, where the two-stage interleaving pattern indicates a first interleaving pattern of resource blocks within an allocated set of UE resources and a second interleaving pattern of resource blocks within the bandwidth part.

The reception manager 825 may receive the coded information via the channel.

The decoder 830 may decode one or more resource blocks of the coded information based on the two-stage interleaving pattern.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
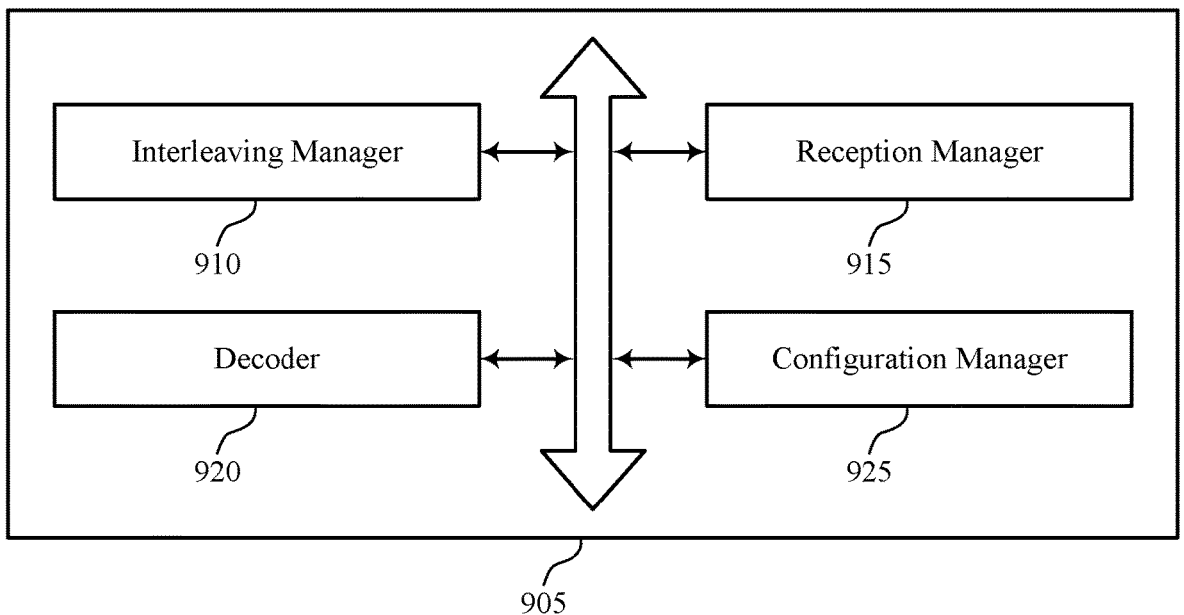
FIG. 9 shows a block diagram of a communications manager that supports two-stage interleaving techniques for wireless communications in accordance with aspects of the present disclosure.

FIG. 9 shows a block diagram 900 of a communications manager 905 that supports two-stage interleaving techniques for wireless communications in accordance with aspects of the present disclosure. The communications manager 905 may be an example of aspects of a communications manager 715, a communications manager 815, or a communications manager 1010 described herein. The communications manager 905 may include an interleaving manager 910, a reception manager 915, a decoder 920, and a configuration manager 925. Each of these modules may communicate, directly or indirectly, with one another (e.g., via one or more buses).

The interleaving manager 910 may determine a two-stage interleaving pattern for receiving coded information from a base station via a channel having a channel bandwidth within a bandwidth part of a total frequency bandwidth, where the two-stage interleaving pattern indicates a first interleaving pattern of resource blocks within an allocated set of UE resources and a second interleaving pattern of resource blocks within the bandwidth part.

In some examples, the interleaving manager 910 may receive, via downlink control information, a control bit that indicates the two-stage interleaving pattern is used for downlink transmissions to the UE in the allocated set of UE resources. In some cases, the control bit indicates that the two-stage interleaving pattern is used or that no interleaving is used for the downlink transmissions to the UE in the allocated set of UE resources. In some cases, the control bit indicates that the two-stage interleaving pattern is used or that only the second interleaving pattern is used for the downlink transmissions to the UE in the allocated set of UE resources. In some cases, the control bit indicates that the two-stage interleaving pattern is used or that no interleaving is used for the downlink transmissions to the UE in the allocated set of UE resources when the downlink control information is transmitted to a set of UEs. In some cases, the control bit indicates that the two-stage interleaving pattern is used or that only the second interleaving pattern is used for the downlink transmissions to the UE in the allocated set of UE resources when the downlink control information is provided in a UE-specific transmission. In some cases, the downlink control information transmitted to a set of UEs provides PDSCH information that is scheduled by a PDCCH transmission that is scrambled by a system information radio network temporary identifier (SI-RNTI) of the UE or in a PDCCH transmission in a common search space. In some cases, the control bit indicates that the two-stage interleaving pattern is used or that only the first interleaving pattern is used for the downlink transmissions to the UE in the allocated set of UE resources. In some cases, the indication that the two-stage interleaving pattern is used for transmitting the coded information via the channel indicates whether the coded information has no interleaving, only the first interleaving pattern, only the second interleaving pattern, or the two-stage interleaving pattern.

In some examples, the interleaving manager 910 may receive a two-bit indicator in downlink control information that indicates the two-stage interleaving pattern is used for downlink transmissions to the UE in the allocated set of UE resources. In some cases, the two-stage interleaving pattern is based on the first interleaving pattern being initially applied to resource blocks within the allocated set of UE resources, and the second interleaving pattern being subsequently applied to resource blocks within the bandwidth part, and where the bandwidth part spans a larger bandwidth than the channel bandwidth. In some cases, the two-bit indicator indicates, when the downlink control information is transmitted to a set of UEs, whether no interleaving is used, whether only the second interleaving pattern is used, or whether the two-stage interleaving pattern is used for the downlink transmissions to the UE in the allocated set of UE resources. In some cases, a first bit of the two-bit indicator indicates whether no interleaving is used, or whether only the second interleaving pattern is used for the downlink transmissions to the UE in the allocated set of UE resources. In some cases, the two-bit indicator indicates, when the downlink control information is provided in a UE-specific transmission, whether no interleaving is used, whether only the first interleaving pattern is used, whether only the second interleaving pattern is used, or whether the two-stage interleaving pattern is used for the downlink transmissions to the UE in the allocated set of UE resources. In some cases, a first bit of the two-bit indicator corresponds to a dynamic interleaving indicator bit, and a second bit of the two-bit indicator corresponds to a dynamic physical resource block group (PRG) indication bit.

The reception manager 915 may receive the coded information via the channel. In some cases, the allocated set of UE resources span two or more contiguous resource blocks in frequency. In some cases, the allocated set of UE resources are PDSCH resources.

The decoder 920 may decode one or more resource blocks of the coded information based on the two-stage interleaving pattern.

The configuration manager 925 may receive, from the base station, an indication that the two-stage interleaving pattern is used for transmitting the coded information via the channel. In some examples, the configuration manager 925 may receive, via RRC signaling, a two-stage interleaving flag that indicates two-stage interleaving is enabled for downlink transmissions to the UE.

Figure 10:
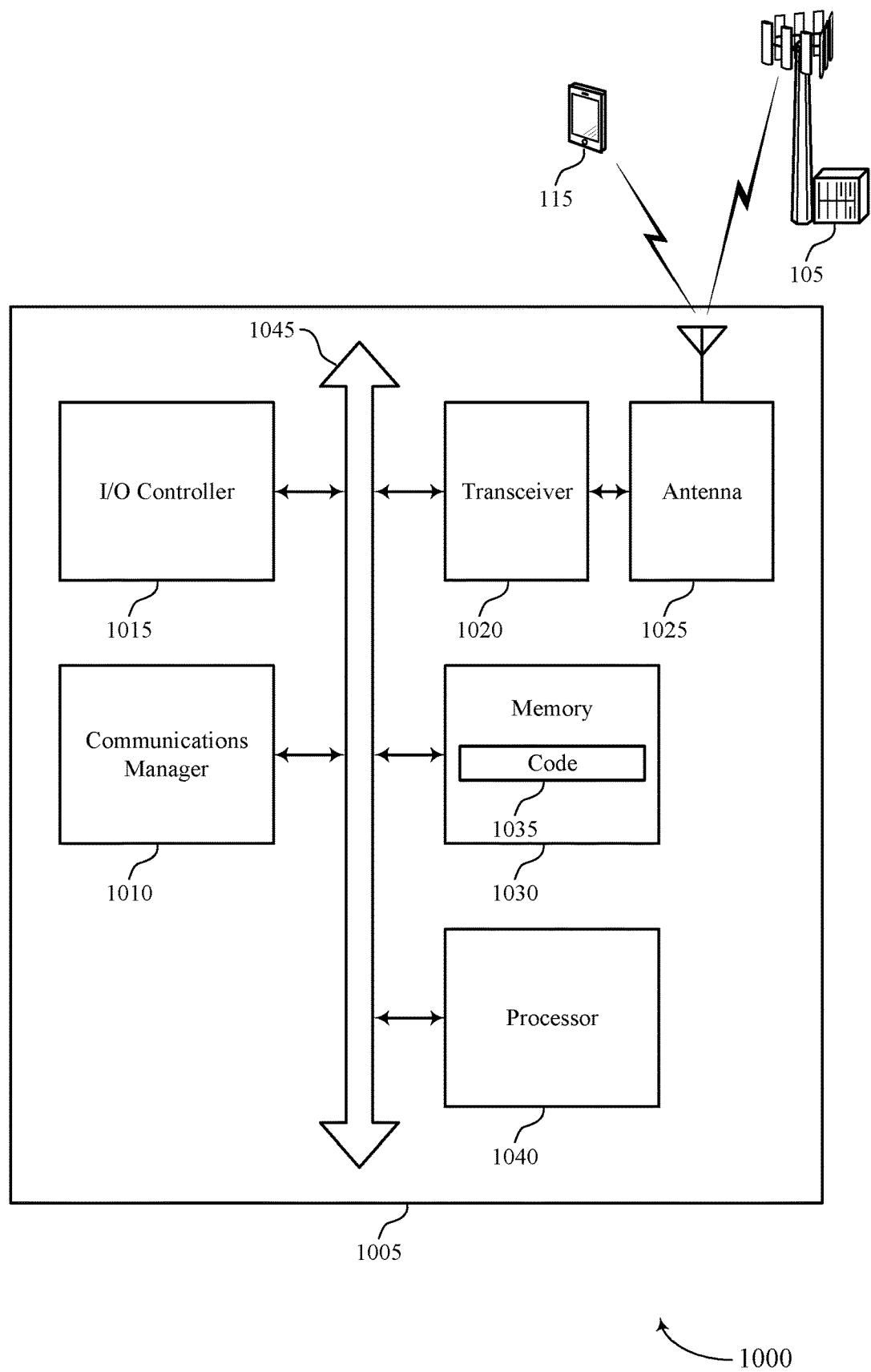
FIG. 10 shows a diagram of a system including a device that supports two-stage interleaving techniques for wireless communications in accordance with aspects of the present disclosure.

FIG. 10 shows a diagram of a system 1000 including a device 1005 that supports two-stage interleaving techniques for wireless communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may determine a two-stage interleaving pattern for receiving coded information from a base station via a channel having a channel bandwidth within a bandwidth part of a total frequency bandwidth, where the two-stage interleaving pattern indicates a first interleaving pattern of resource blocks within an allocated set of UE resources and a second interleaving pattern of resource blocks within the bandwidth part, receive the coded information via the channel, and decode one or more resource blocks of the coded information based on the two-stage interleaving pattern.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting two-stage interleaving techniques for wireless communications).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
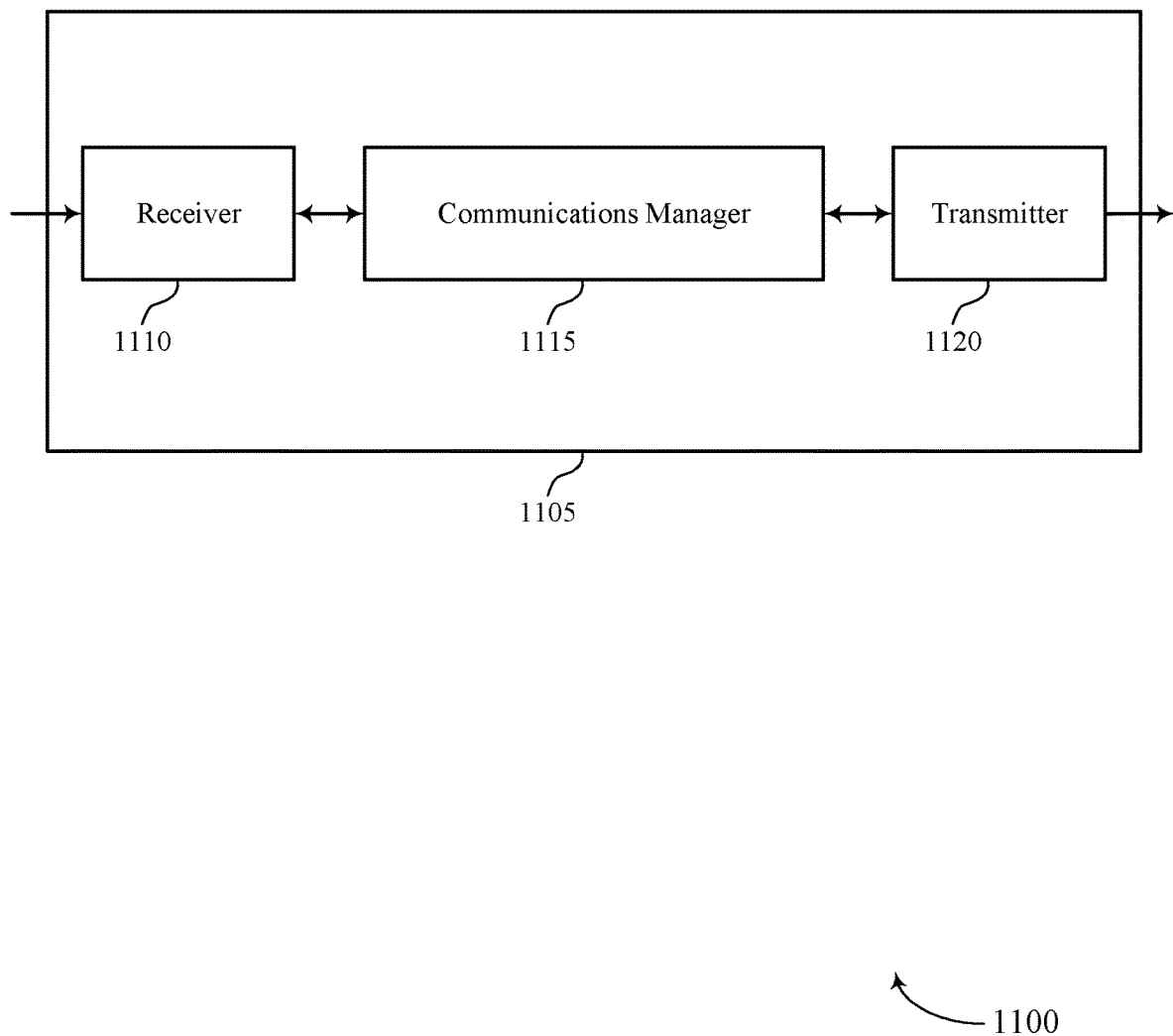
FIGS. 11 and 12 show block diagrams of devices that support two-stage interleaving techniques for wireless communications in accordance with aspects of the present disclosure.

FIG. 11 shows a block diagram 1100 of a device 1105 that supports two-stage interleaving techniques for wireless communications in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to two-stage interleaving techniques for wireless communications, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may determine a two-stage interleaving pattern for transmitting coded information to a UE via a channel having a channel bandwidth within a bandwidth part of a total frequency bandwidth, where the two-stage interleaving pattern indicates a first interleaving pattern for resource blocks within an allocated set of UE resources and a second interleaving pattern for resource blocks within the bandwidth part, interleave one or more resource blocks of the coded information based on the two-stage interleaving pattern, and transmit the interleaved resource blocks via the channel. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
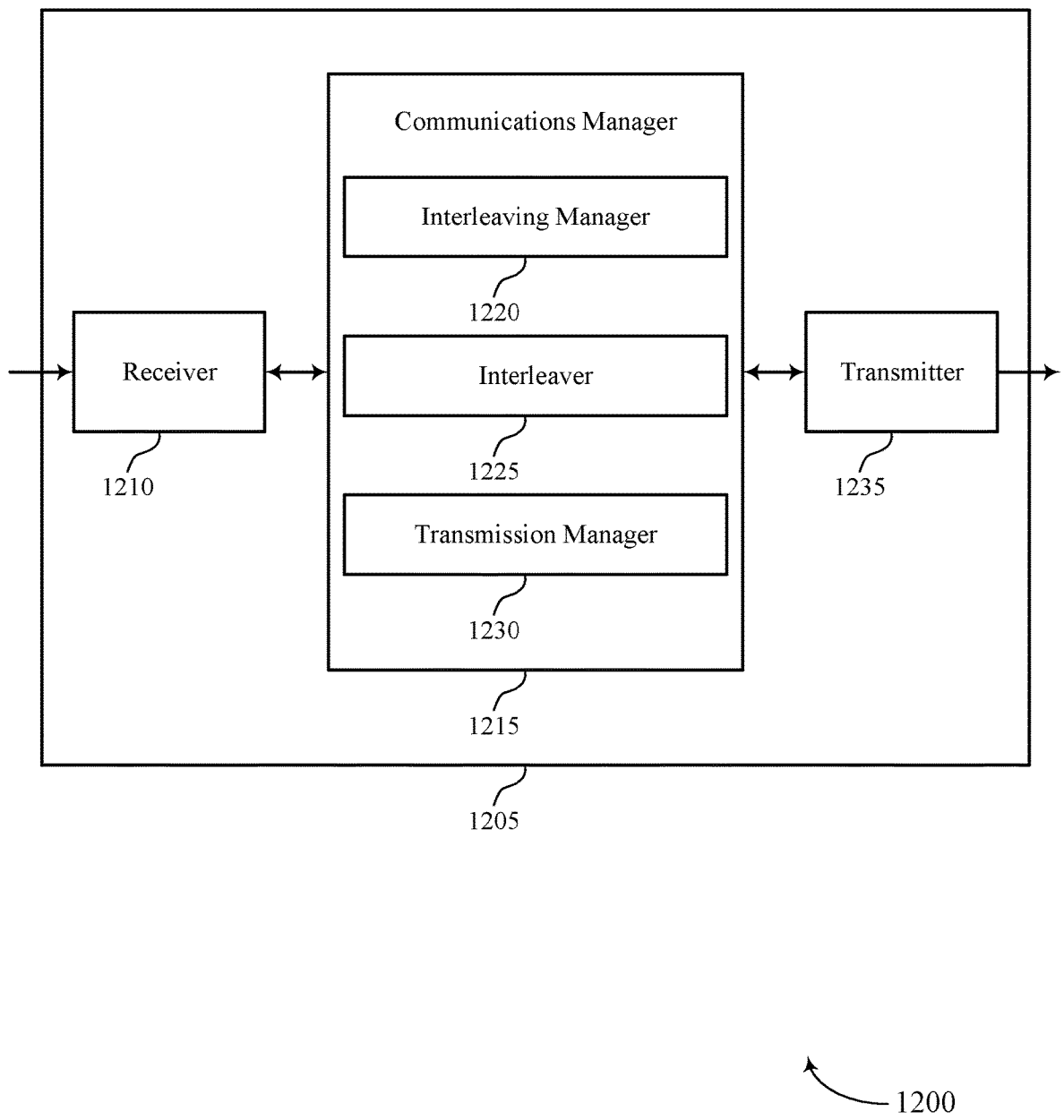

FIG. 12 shows a block diagram 1200 of a device 1205 that supports two-stage interleaving techniques for wireless communications in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to two-stage interleaving techniques for wireless communications, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include an interleaving manager 1220, an interleaver 1225, and a transmission manager 1230. The communications manager 1215 may be an example of aspects of the communications manager 1410 described herein.

The interleaving manager 1220 may determine a two-stage interleaving pattern for transmitting coded information to a UE via a channel having a channel bandwidth within a bandwidth part of a total frequency bandwidth, where the two-stage interleaving pattern indicates a first interleaving pattern for resource blocks within an allocated set of UE resources and a second interleaving pattern for resource blocks within the bandwidth part.

The interleaver 1225 may interleave one or more resource blocks of the coded information based on the two-stage interleaving pattern.

The transmission manager 1230 may transmit the interleaved resource blocks via the channel.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
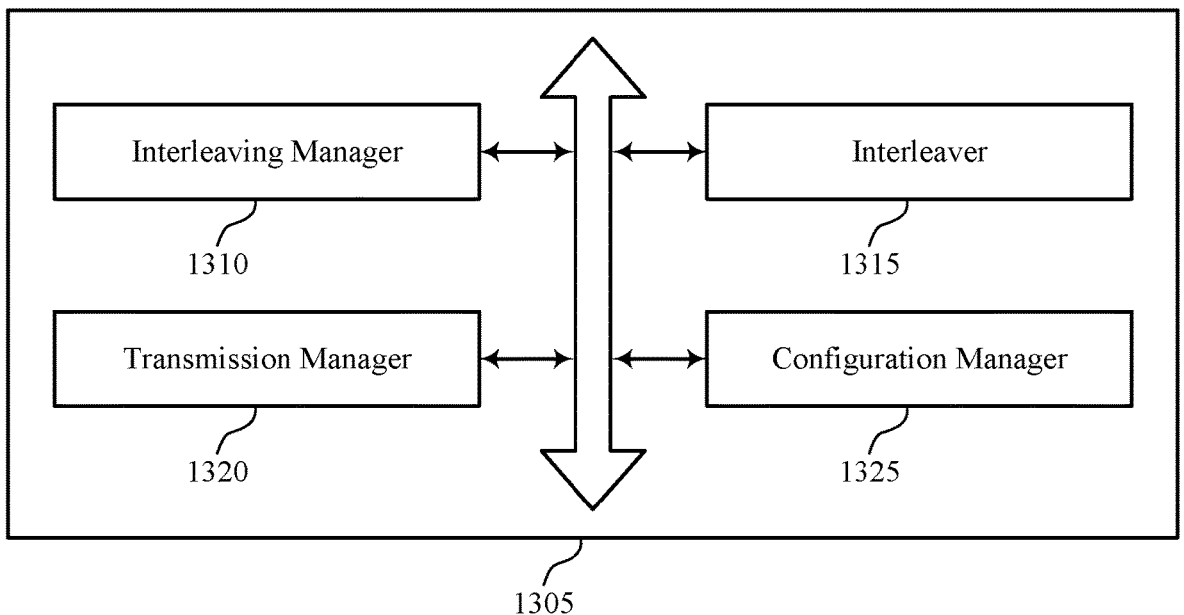
FIG. 13 shows a block diagram of a communications manager that supports two-stage interleaving techniques for wireless communications in accordance with aspects of the present disclosure.

FIG. 13 shows a block diagram 1300 of a communications manager 1305 that supports two-stage interleaving techniques for wireless communications in accordance with aspects of the present disclosure. The communications manager 1305 may be an example of aspects of a communications manager 1115, a communications manager 1215, or a communications manager 1410 described herein. The communications manager 1305 may include an interleaving manager 1310, an interleaver 1315, a transmission manager 1320, and a configuration manager 1325. Each of these modules may communicate, directly or indirectly, with one another (e.g., via one or more buses).

The interleaving manager 1310 may determine a two-stage interleaving pattern for transmitting coded information to a UE via a channel having a channel bandwidth within a bandwidth part of a total frequency bandwidth, where the two-stage interleaving pattern indicates a first interleaving pattern for resource blocks within an allocated set of UE resources and a second interleaving pattern for resource blocks within the bandwidth part.

In some examples, the interleaving manager 1310 may transmit, via downlink control information, a control bit that indicates the two-stage interleaving pattern is used for downlink transmissions to the UE in the allocated set of UE resources. In some cases, the control bit indicates that the two-stage interleaving pattern is used or that no interleaving is used for the downlink transmissions to the UE in the allocated set of UE resources. In some cases, the control bit indicates that the two-stage interleaving pattern is used or that only the second interleaving pattern is used for the downlink transmissions to the UE in the allocated set of UE resources. In some cases, the control bit indicates that the two-stage interleaving pattern is used or that no interleaving is used for the downlink transmissions to the UE in the allocated set of UE resources when the downlink control information is transmitted to a set of UEs. In some cases, the control bit indicates that the two-stage interleaving pattern is used or that only the second interleaving pattern is used for the downlink transmissions to the UE in the allocated set of UE resources when the downlink control information is provided in a UE-specific transmission. In some cases, the downlink control information transmitted to a set of UEs provides PDSCH information that is scheduled by a PDCCH transmission that is scrambled by a system information radio network temporary identifier (SI-RNTI) of the UE or in a PDCCH transmission in a common search space. In some cases, the control bit indicates that the two-stage interleaving pattern is used or that only the first interleaving pattern is used for the downlink transmissions to the UE in the allocated set of UE resources. In some cases, the indication that the two-stage interleaving pattern is used for transmitting the coded information via the channel indicates whether the coded information has no interleaving, only the first interleaving pattern, only the second interleaving pattern, or the two-stage interleaving pattern.

In some examples, the interleaving manager 1310 may transmit a two-bit indicator in downlink control information to the UE, where the two-bit indicator indicates the two-stage interleaving pattern is used for downlink transmissions to the UE in the allocated set of UE resources. In some examples, the interleaving manager 1310 may, when the downlink control information is transmitted to a set of UEs, a first bit of the two-bit indicator indicates whether no interleaving is used, or whether only the second interleaving pattern is used for the downlink transmissions to the UE in the allocated set of UE resources. In some cases, the two-bit indicator indicates, when the downlink control information is transmitted to a set of UEs, whether no interleaving is used, whether only the second interleaving pattern is used, or whether the two-stage interleaving pattern is used for the downlink transmissions to the UE in the allocated set of UE resources. In some cases, the two-bit indicator indicates, when the downlink control information is provided in a UE-specific transmission, whether no interleaving is used, whether only the first interleaving pattern is used, whether only the second interleaving pattern is used, or whether the two-stage interleaving pattern is used for the downlink transmissions to the UE in the allocated set of UE resources. In some cases, a first bit of the two-bit indicator corresponds to a dynamic interleaving indicator bit, and a second bit of the two-bit indicator corresponds to a dynamic physical resource block group (PRG) indication bit. In some cases, the two-stage interleaving pattern is based on the first interleaving pattern being initially applied to resource blocks within the allocated set of UE resources, and the second interleaving pattern being subsequently applied to resource blocks within the bandwidth part, and where the bandwidth part spans a larger bandwidth than the channel bandwidth.

The interleaver 1315 may interleave one or more resource blocks of the coded information based on the two-stage interleaving pattern.

The transmission manager 1320 may transmit the interleaved resource blocks via the channel. In some cases, the allocated set of UE resources span two or more contiguous resource blocks in frequency. In some cases, the allocated set of UE resources are PDSCH resources.

The configuration manager 1325 may transmit, to the UE, an indication that the two-stage interleaving pattern is used for transmitting the coded information via the channel. In some examples, the configuration manager 1325 may transmit, via RRC signaling, a two-stage interleaving flag that indicates two-stage interleaving is enabled for downlink transmissions to the UE.

Figure 14:
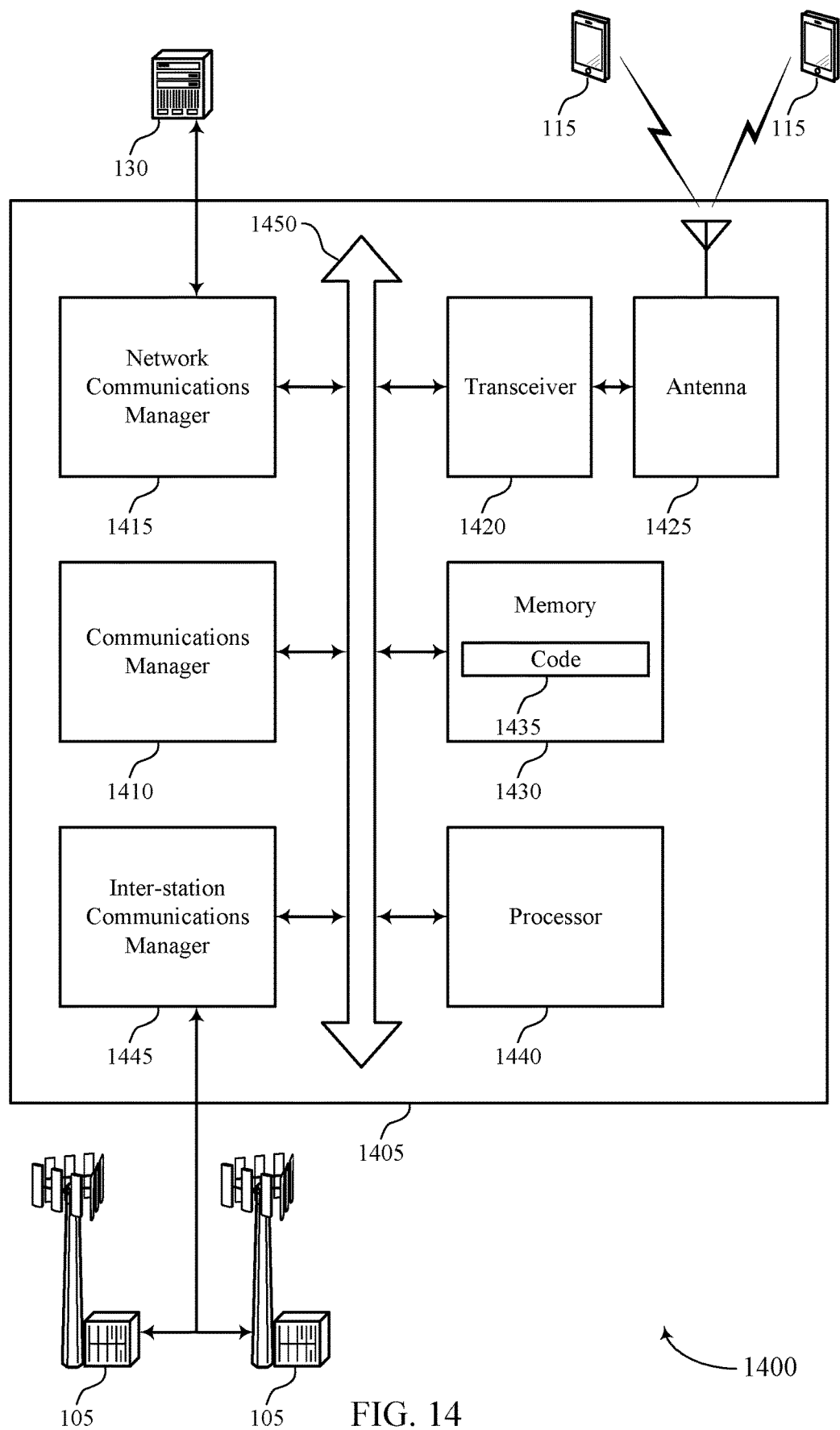
FIG. 14 shows a diagram of a system including a device that supports two-stage interleaving techniques for wireless communications in accordance with aspects of the present disclosure.

FIG. 14 shows a diagram of a system 1400 including a device 1405 that supports two-stage interleaving techniques for wireless communications in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may determine a two-stage interleaving pattern for transmitting coded information to a UE via a channel having a channel bandwidth within a bandwidth part of a total frequency bandwidth, where the two-stage interleaving pattern indicates a first interleaving pattern for resource blocks within an allocated set of UE resources and a second interleaving pattern for resource blocks within the bandwidth part, interleave one or more resource blocks of the coded information based on the two-stage interleaving pattern, and transmit the interleaved resource blocks via the channel.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting two-stage interleaving techniques for wireless communications).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
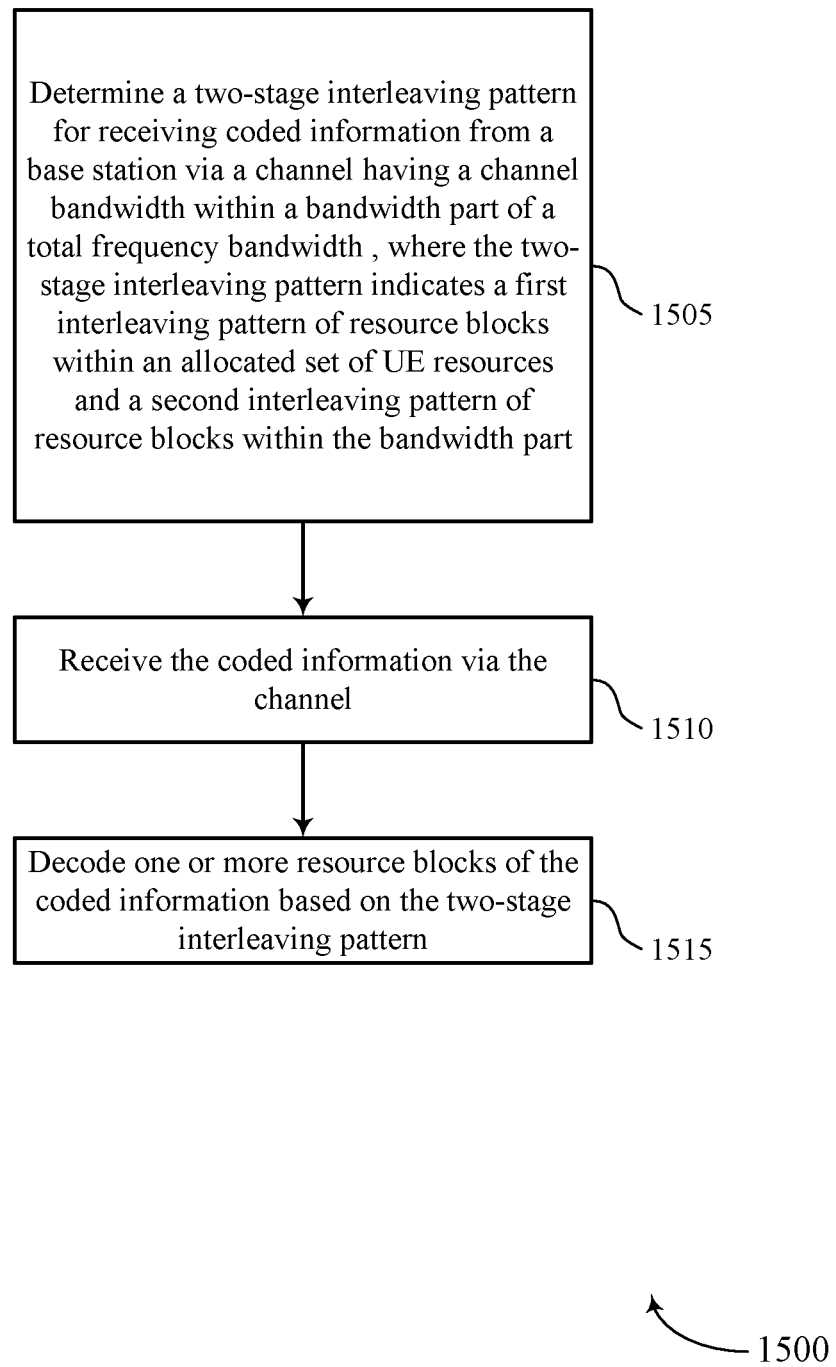
FIGS. 15 through 18 show flowcharts illustrating methods that support two-stage interleaving techniques for wireless communications in accordance with aspects of the present disclosure.

FIG. 15 shows a flowchart illustrating a method 1500 that supports two-stage interleaving techniques for wireless communications in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may determine a two-stage interleaving pattern for receiving coded information from a base station via a channel having a channel bandwidth within a bandwidth part of a total frequency bandwidth, where the two-stage interleaving pattern indicates a first interleaving pattern of resource blocks within an allocated set of UE resources and a second interleaving pattern of resource blocks within the bandwidth part. The operations of 1505 may be performed according to the methods described herein. In some examples, aspects of the operations of 1505 may be performed by an interleaving manager as described with reference to FIGS. 7 through 10.

At 1510, the UE may receive the coded information via the channel. The operations of 1510 may be performed according to the methods described herein. In some examples, aspects of the operations of 1510 may be performed by a reception manager as described with reference to FIGS. 7 through 10.

At 1515, the UE may decode one or more resource blocks of the coded information based on the two-stage interleaving pattern. The operations of 1515 may be performed according to the methods described herein. In some examples, aspects of the operations of 1515 may be performed by a decoder as described with reference to FIGS. 7 through 10.

Figure 16:
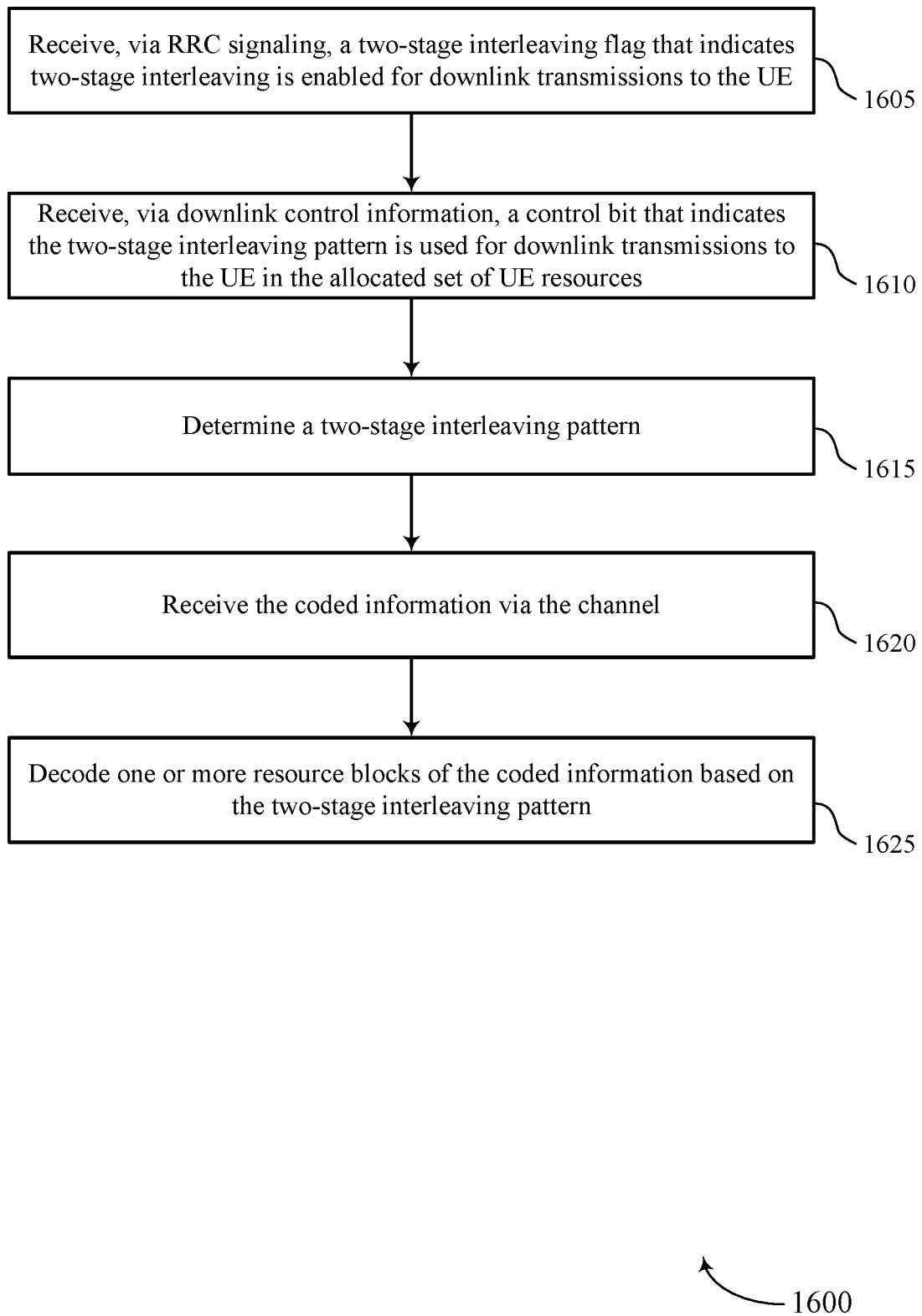

FIG. 16 shows a flowchart illustrating a method 1600 that supports two-stage interleaving techniques for wireless communications in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, via RRC signaling, a two-stage interleaving flag that indicates two-stage interleaving is enabled for downlink transmissions to the UE. The operations of 1610 may be performed according to the methods described herein. In some examples, aspects of the operations of 1610 may be performed by a configuration manager as described with reference to FIGS. 7 through 10.

At 1610, the UE may receive, via downlink control information, a control bit that indicates the two-stage interleaving pattern is used for downlink transmissions to the UE in the allocated set of UE resources. The operations of 1610 may be performed according to the methods described herein. In some examples, aspects of the operations of 1610 may be performed by an interleaving manager as described with reference to FIGS. 7 through 10.

At 1615, the UE may determine a two-stage interleaving pattern for receiving coded information. In some cases, the two-stage interleaving pattern indicates a first interleaving pattern of resource blocks within an allocated set of UE resources and a second interleaving pattern of resource blocks within the bandwidth part. The operations of 1615 may be performed according to the methods described herein. In some examples, aspects of the operations of 1615 may be performed by an interleaving manager as described with reference to FIGS. 7 through 10.

At 1620, the UE may receive the coded information via the channel. The operations of 1620 may be performed according to the methods described herein. In some examples, aspects of the operations of 1620 may be performed by a reception manager as described with reference to FIGS. 7 through 10.

At 1625, the UE may decode one or more resource blocks of the coded information based on the two-stage interleaving pattern. The operations of 1625 may be performed according to the methods described herein. In some examples, aspects of the operations of 1625 may be performed by a decoder as described with reference to FIGS. 7 through 10.

Figure 17:
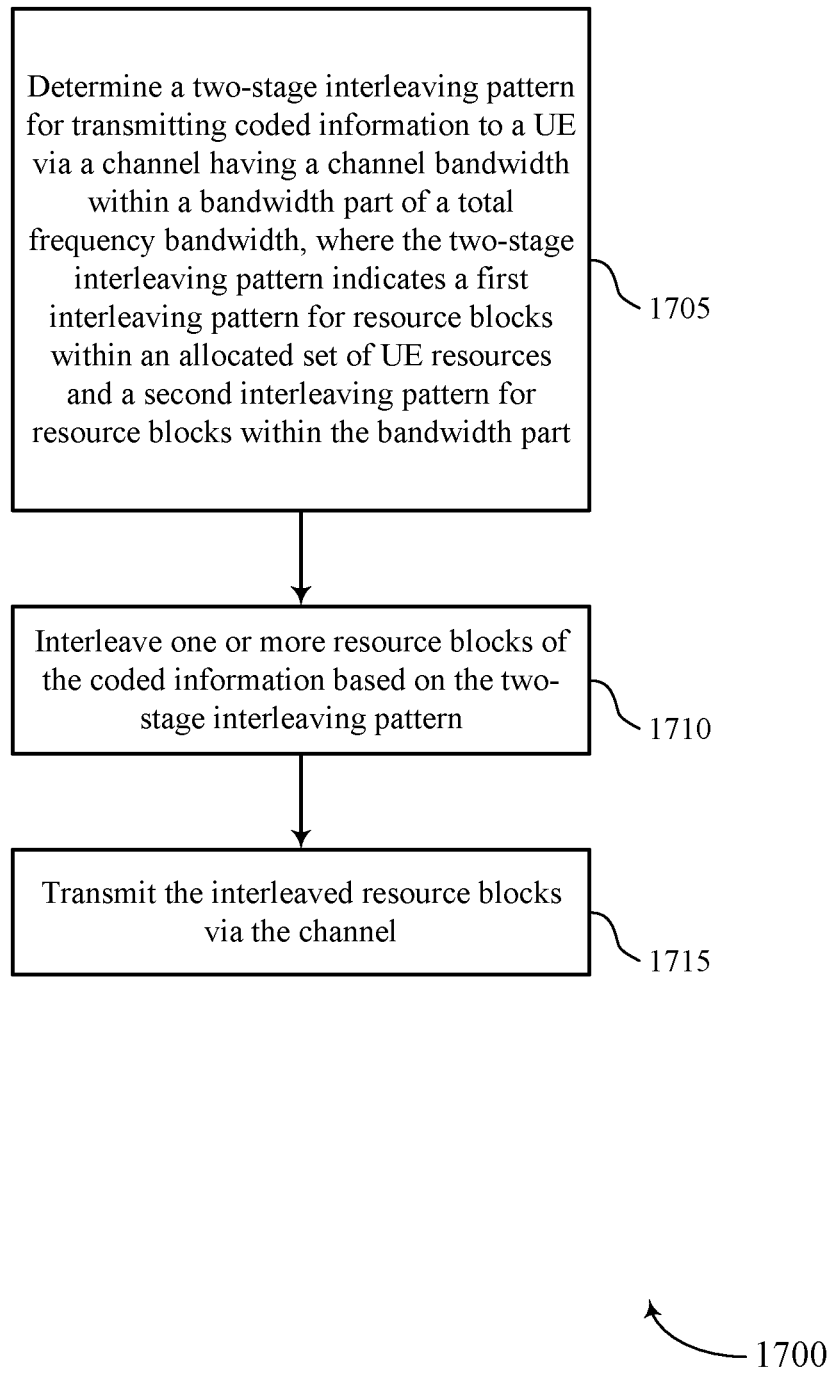

FIG. 17 shows a flowchart illustrating a method 1700 that supports two-stage interleaving techniques for wireless communications in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may determine a two-stage interleaving pattern for transmitting coded information to a UE via a channel having a channel bandwidth within a bandwidth part of a total frequency bandwidth, where the two-stage interleaving pattern indicates a first interleaving pattern for resource blocks within an allocated set of UE resources and a second interleaving pattern for resource blocks within the bandwidth part. The operations of 1705 may be performed according to the methods described herein. In some examples, aspects of the operations of 1705 may be performed by an interleaving manager as described with reference to FIGS. 11 through 14.

At 1710, the base station may interleave one or more resource blocks of the coded information based on the two-stage interleaving pattern. The operations of 1710 may be performed according to the methods described herein. In some examples, aspects of the operations of 1710 may be performed by an interleaver as described with reference to FIGS. 11 through 14.

At 1715, the base station may transmit the interleaved resource blocks via the channel. The operations of 1715 may be performed according to the methods described herein. In some examples, aspects of the operations of 1715 may be performed by a transmission manager as described with reference to FIGS. 11 through 14.

Figure 18:
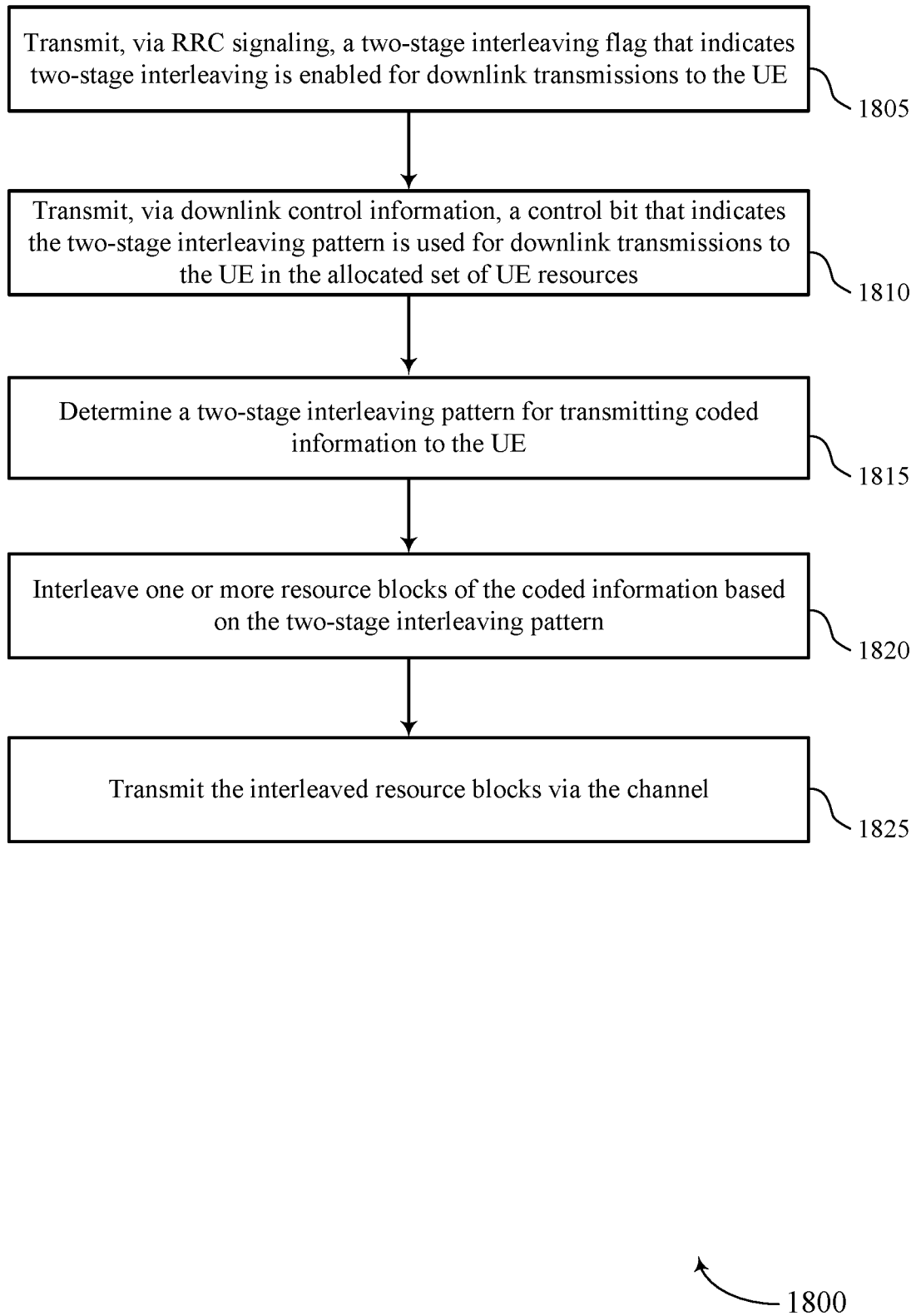

FIG. 18 shows a flowchart illustrating a method 1800 that supports two-stage interleaving techniques for wireless communications in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may transmit, via RRC signaling, a two-stage interleaving flag that indicates two-stage interleaving is enabled for downlink transmissions to the UE. The operations of 1805 may be performed according to the methods described herein. In some examples, aspects of the operations of 1805 may be performed by a configuration manager as described with reference to FIGS. 11 through 14.

At 1810, the base station may transmit, via downlink control information, a control bit that indicates the two-stage interleaving pattern is used for downlink transmissions to the UE in the allocated set of UE resources. The operations of 1810 may be performed according to the methods described herein. In some examples, aspects of the operations of 1810 may be performed by an interleaving manager as described with reference to FIGS. 11 through 14.

At 1815, the base station may determine a two-stage interleaving pattern for transmitting coded information to a UE. In some cases, the two-stage interleaving pattern indicates a first interleaving pattern for resource blocks within an allocated set of UE resources and a second interleaving pattern for resource blocks within the bandwidth part. The operations of 1815 may be performed according to the methods described herein. In some examples, aspects of the operations of 1815 may be performed by an interleaving manager as described with reference to FIGS. 11 through 14.

At 1820, the base station may interleave one or more resource blocks of the coded information based on the two-stage interleaving pattern. The operations of 1820 may be performed according to the methods described herein. In some examples, aspects of the operations of 1820 may be performed by an interleaver as described with reference to FIGS. 11 through 14.

At 1825, the base station may transmit the interleaved resource blocks via the channel. The operations of 1825 may be performed according to the methods described herein. In some examples, aspects of the operations of 1825 may be performed by a transmission manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   determining a two-stage interleaving pattern for receiving coded information from a network entity via a channel having a channel bandwidth within a bandwidth part of a total frequency bandwidth, wherein the two-stage interleaving pattern indicates a first interleaving pattern of resource blocks within an allocated set of UE resources and a second interleaving pattern of resource blocks within the bandwidth part;
   receiving, via downlink control information, a control bit that indicates whether the two-stage interleaving pattern is used for downlink transmissions to the UE in the allocated set of UE resources, wherein the control bit indicates that the two-stage interleaving pattern is used or that no interleaving is used for the downlink transmissions when the downlink control information is transmitted to a plurality of UEs, and wherein the control bit indicates that the two-stage interleaving pattern is used or that only the second interleaving pattern is used for the downlink transmissions when the downlink control information is provided in a UE-specific transmission;
   receiving the coded information via the channel; and
   decoding one or more resource blocks of the coded information based at least in part on the control bit associated with the two-stage interleaving pattern.

2. The method of claim 1, wherein the two-stage interleaving pattern is based on the first interleaving pattern being initially applied to resource blocks within the allocated set of UE resources, and the second interleaving pattern being subsequently applied to resource blocks within the bandwidth part, and wherein the bandwidth part spans a larger bandwidth than the channel bandwidth.

3. The method of claim 1, further comprising:
   receiving, from the network entity, an indication that the two-stage interleaving pattern is used for transmitting the coded information via the channel.

4. The method of claim 3, wherein receiving the indication from the network entity comprises:
   receiving, via radio resource control (RRC) signaling, a two-stage interleaving flag that indicates two-stage interleaving is enabled for downlink transmissions to the UE.

5. The method of claim 4, wherein the control bit indicates that the two-stage interleaving pattern is used or that no interleaving is used for the downlink transmissions to the UE in the allocated set of UE resources.

6. The method of claim 4, wherein the control bit indicates that the two-stage interleaving pattern is used or that only the second interleaving pattern is used for the downlink transmissions to the UE in the allocated set of UE resources.

7. The method of claim 1, wherein the downlink control information transmitted to the plurality of UEs provides physical downlink shared channel (PDSCH) information that is scheduled by a physical downlink control channel (PDCCH) transmission that is scrambled by a system information radio network temporary identifier (SI-RNTI) of the UE or in a PDCCH transmission in a common search space.

8. The method of claim 4, wherein the control bit indicates that the two-stage interleaving pattern is used or that only the first interleaving pattern is used for the downlink transmissions to the UE in the allocated set of UE resources.

9. The method of claim 3, wherein the indication that the two-stage interleaving pattern is used for transmitting the coded information via the channel indicates whether the coded information has no interleaving, only the first interleaving pattern, only the second interleaving pattern, or the two-stage interleaving pattern.

10. The method of claim 1, wherein the allocated set of UE resources span two or more contiguous resource blocks in frequency.

11. The method of claim 10, wherein the allocated set of UE resources are provided in the downlink control information in a Type 1 allocation that provides a contiguous allocation of frequency resources.

12. The method of claim 1, wherein the allocated set of UE resources are physical downlink shared channel (PDSCH) resources.

13. The method of claim 1, wherein the determining comprises:
receiving a two-bit indicator in the downlink control information that indicates the two-stage interleaving pattern is used for downlink transmissions to the UE in the allocated set of UE resources.

14. The method of claim 13, wherein the two-bit indicator indicates, when the downlink control information is transmitted to a plurality of UEs, whether no interleaving is used, whether only the second interleaving pattern is used, or whether the two-stage interleaving pattern is used for the downlink transmissions to the UE in the allocated set of UE resources.

15. The method of claim 13, wherein, when the downlink control information is transmitted to a plurality of UEs, a first bit of the two-bit indicator indicates whether no interleaving is used, or whether only the second interleaving pattern is used for the downlink transmissions to the UE in the allocated set of UE resources.

16. The method of claim 13, wherein the two-bit indicator indicates, when the downlink control information is provided in a UE-specific transmission, whether no interleaving is used, whether only the first interleaving pattern is used, whether only the second interleaving pattern is used, or whether the two-stage interleaving pattern is used for the downlink transmissions to the UE in the allocated set of UE resources.

17. The method of claim 13, wherein a first bit of the two-bit indicator corresponds to a dynamic interleaving indicator bit, and a second bit of the two-bit indicator corresponds to a dynamic physical resource block group (PRG) indication bit.

18. A method for wireless communications at a network entity, comprising:
determining a two-stage interleaving pattern for transmitting coded information to a user equipment (UE) via a channel having a channel bandwidth within a bandwidth part of a total frequency bandwidth, wherein the two-stage interleaving pattern indicates a first interleaving pattern for resource blocks within an allocated set of UE resources and a second interleaving pattern for resource blocks within the bandwidth part;
transmitting, via downlink control information, a two-bit indicator that indicates whether the two-stage interleaving pattern is used for downlink transmissions to the UE in the allocated set of UE resources, wherein the two-bit indicator indicates that the two-stage interleaving pattern is used or that no interleaving is used for the downlink transmissions when the downlink control information is transmitted to a plurality of UEs, and wherein the two-bit indicator indicates that the two-stage interleaving pattern is used or that only the second interleaving pattern is used for the downlink transmissions when the downlink control information is provided in a UE-specific transmission;
interleaving one or more resource blocks of the coded information based at least in part on the two-bit indicator associated with the two-stage interleaving pattern; and
transmitting the one or more interleaved resource blocks via the channel.

19. The method of claim 18, wherein the two-stage interleaving pattern is based on the first interleaving pattern being initially applied to resource blocks within the allocated set of UE resources, and the second interleaving pattern being subsequently applied to resource blocks within the bandwidth part, and wherein the bandwidth part spans a larger bandwidth than the channel bandwidth.

20. The method of claim 18, further comprising:
transmitting, to the UE, an indication that the two-stage interleaving pattern is used for transmitting the coded information via the channel.

21. The method of claim 20, wherein the transmitting the indication to the UE comprises:
transmitting, via radio resource control (RRC) signaling, a two-stage interleaving flag that indicates two-stage interleaving is enabled for downlink transmissions to the UE.

22. The method of claim 20, wherein the indication that the two-stage interleaving pattern is used for transmitting the coded information via the channel indicates whether the coded information has no interleaving, only the first interleaving pattern, only the second interleaving pattern, or the two-stage interleaving pattern.

23. The method of claim 18, wherein the allocated set of UE resources span two or more contiguous resource blocks in frequency.

24. The method of claim 18, wherein the two-bit indicator indicates, when the downlink control information is transmitted to a plurality of UEs, whether no interleaving is used, whether only the second interleaving pattern is used, or whether the two-stage interleaving pattern is used for the downlink transmissions to the UE in the allocated set of UE resources.

25. The method of claim 18, wherein, when the downlink control information is transmitted to a plurality of UEs, a first bit of the two-bit indicator indicates whether no interleaving is used, or whether only the second interleaving pattern is used for the downlink transmissions to the UE in the allocated set of UE resources.

26. The method of claim 18, wherein the two-bit indicator indicates, when the downlink control information is provided in a UE-specific transmission, whether no interleaving is used, whether only the first interleaving pattern is used, whether only the second interleaving pattern is used, or whether the two-stage interleaving pattern is used for the downlink transmissions to the UE in the allocated set of UE resources.

27. An apparatus for wireless communications at a user equipment (UE), comprising:
a processor,
memory coupled with the processor; and
instructions stored in the memory and executable by the processor to cause the apparatus to:
determine a two-stage interleaving pattern for receiving coded information from a network entity via a channel having a channel bandwidth within a bandwidth part of a total frequency bandwidth, wherein the two-stage interleaving pattern indicates a first interleaving pattern of resource blocks within an allocated set of UE resources and a second interleaving pattern of resource blocks within the bandwidth part;

receive, via downlink control information, a control bit that indicates whether the two-stage interleaving pattern is used for downlink transmissions to the UE in the allocated set of UE resources, wherein the control bit indicates that the two-stage interleaving pattern is used or that no interleaving is used for the downlink transmissions when the downlink control information is transmitted to a plurality of UEs, and wherein the control bit indicates that the two-stage interleaving pattern is used or that only the second interleaving pattern is used for the downlink transmissions when the downlink control information is provided in a UE-specific transmission;

receive the coded information via the channel; and decode one or more resource blocks of the coded information based at least in part on the control bit associated with the two-stage interleaving pattern.

28. An apparatus for wireless communications at a network entity, comprising:

a processor, memory coupled with the processor; and instructions stored in the memory and executable by the processor to cause the apparatus to:

determine a two-stage interleaving pattern for transmitting coded information to a user equipment (UE) via a channel having a channel bandwidth within a bandwidth part of a total frequency bandwidth, wherein the two-stage interleaving pattern indicates a first interleaving pattern for resource blocks within an allocated set of UE resources and a second interleaving pattern for resource blocks within the bandwidth part;

transmit, via downlink control information, a two-bit indicator that indicates whether the two-stage interleaving pattern is used for downlink transmissions to the UE in the allocated set of UE resources, wherein the two-bit indicator indicates that the two-stage interleaving pattern is used or that no interleaving is used for the downlink transmissions when the downlink control information is transmitted to a plurality of UEs, and wherein the two-bit indicator indicates that the two-stage interleaving pattern is used or that only the second interleaving pattern is used for the downlink transmissions when the downlink control information is provided in a UE-specific transmission;

interleave one or more resource blocks of the coded information based at least in part on the two-bit indicator associated with the two-stage interleaving pattern; and transmit the one or more interleaved resource blocks via the channel.

* * * * *